United States Patent
Yamazaki

(10) Patent No.: US 8,035,634 B2
(45) Date of Patent: Oct. 11, 2011

(54) ELECTRO-OPTICAL DEVICE, DRIVING CIRCUIT, AND ELECTRONIC APPARATUS

(75) Inventor: Katsunori Yamazaki, Matsumoto (JP)

(73) Assignee: Sony Corporation, Tokyo (JP)

(*) Notice: Subject to any disclaimer, the term of this patent is extended or adjusted under 35 U.S.C. 154(b) by 1100 days.

(21) Appl. No.: 11/882,847

(22) Filed: Aug. 6, 2007

(65) Prior Publication Data

US 2008/0036751 A1 Feb. 14, 2008

(30) Foreign Application Priority Data

Aug. 10, 2006 (JP) .................... 2006-217821

(51) Int. Cl.
*G06F 3/038* (2006.01)
*G09G 5/00* (2006.01)
*G02F 1/133* (2006.01)

(52) U.S. Cl. ........ 345/212; 345/211; 345/213; 345/214; 349/33; 349/37

(58) Field of Classification Search .................. 345/214, 345/94–96, 208–210; 349/33, 37
See application file for complete search history.

(56) References Cited

U.S. PATENT DOCUMENTS

| 5,489,910 A * | 2/1996 | Kuwata et al. ............... 345/212 |
| 6,049,319 A * | 4/2000 | Sakamoto et al. ............. 345/94 |
| 2002/0084969 A1 * | 7/2002 | Ozawa ........................... 345/96 |
| 2005/0219187 A1 * | 10/2005 | Shih ................................ 345/94 |
| 2008/0055300 A1 * | 3/2008 | Yamazaki ..................... 345/212 |

FOREIGN PATENT DOCUMENTS

| JP | B2 2568659 | 10/1996 |
| JP | A 2001-083943 | 3/2001 |
| JP | A-2006-78588 | 3/2006 |

* cited by examiner

*Primary Examiner* — Sumati Lefkowitz
*Assistant Examiner* — Jonathan Horner
(74) *Attorney, Agent, or Firm* — K&L Gates LLP

(57) ABSTRACT

A driving circuit includes a plurality of scanning lines, a plurality of data lines, a plurality of capacitor lines, pixels, a scanning line driving circuit, a capacitor line driving circuit, a first capacitive signal output circuit, and a data line driving circuit. Each of the pixels includes a pixel switching element, a pixel capacitor, and a storage capacitor. The capacitor line driving circuit supplies a first capacitive signal to the capacitor line when the one scanning line is selected, and changes a voltage value of the first capacitive signal when a scanning line, located a predetermined number of scanning lines away from the one scanning line, is selected. The first capacitive signal output circuit adjusts and outputs a voltage of the first capacitive signal when the one scanning line is selected. The data line driving circuit supplies the pixels with data signals of voltages corresponding to gray scale levels.

7 Claims, 18 Drawing Sheets

FIG. 12
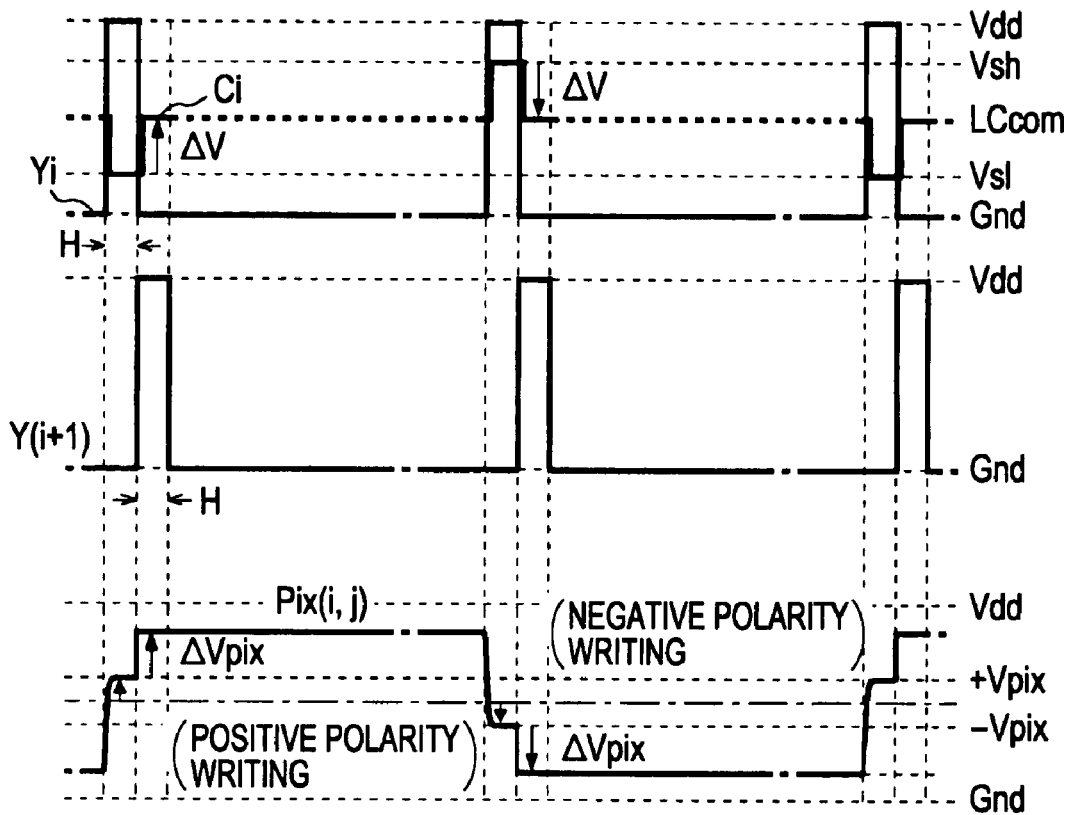
FIG. 13A
POSITIVE
POLARITY WRITING
FIG. 13B
NEGATIVE
POLARITY WRITING
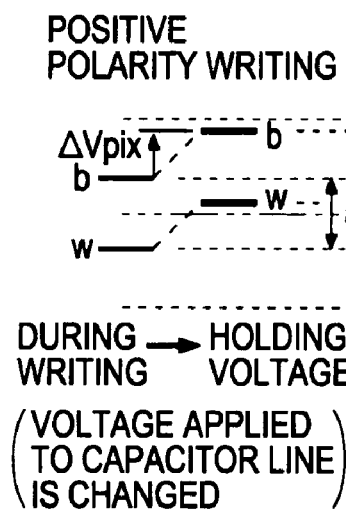
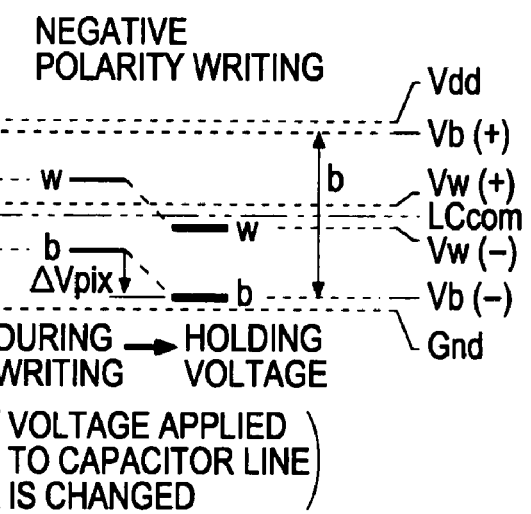

ELECTRO-OPTICAL DEVICE, DRIVING CIRCUIT, AND ELECTRONIC APPARATUS

BACKGROUND

1. Technical Field

The present invention relates to a technology that suppresses a voltage amplitude of a data line with a simple configuration in an electro-optical device, such as a liquid crystal display.

2. Related Art

In an electro-optical device, such as a liquid crystal display, pixel capacitors (liquid crystal capacitors) are provided correspondingly at intersections of scanning lines and data lines. When the pixel capacitors need to be driven by alternating current, the voltage amplitudes of data signals have positive and negative polarities (bipolarity). For this reason, in a data line driving circuit that supplies data signals to the data lines, component elements need to have withstanding voltages corresponding to the voltage amplitudes. JP-A-2001-83943 has proposed a technology in which storage capacitors are provided in parallel with pixel capacitors, and capacitor lines, to which the storage capacitors are commonly connected in each row, are driven by binary voltage in synchronization with selection of the scanning line so as to suppress the voltage amplitudes of data signals.

However, in this technology, because a circuit that drives the capacitor lines is similar to the scanning line driving circuit (actually, a shift register) that drives the scanning lines, the configuration of the circuit that drives the capacitor lines becomes complex. In addition, if a voltage applied to the capacitor line deviates from a predetermined voltage due to superposition of a noise, or the like, pixels corresponding to the capacitor line each cannot display a desired gray scale. The capacitor line of a single row corresponds to a multiple number of pixels. If all of these pixels cannot display a desired gray scale, there is an adverse effect on display.

SUMMARY

An advantage of some aspects of the invention is that it provides an electro-optical device that suppresses voltage amplitudes of data lines with a simple configuration while reducing an adverse effect on display, a driving circuit therefore, and an electronic apparatus.

A first aspect of the invention provides a driving circuit for an electro-optical device. The driving circuit includes a plurality of scanning lines, a plurality of data lines, a plurality of capacitor lines, pixels, a scanning line driving circuit, a capacitor line driving circuit, a first capacitive signal output circuit, and a data line driving circuit. The plurality of capacitor lines are provided in correspondence with the plurality of scanning lines. The pixels are arranged at positions corresponding to intersections of the plurality of scanning lines and the plurality of data lines. Each of the pixels includes a pixel switching element, a pixel capacitor, and a storage capacitor. One end of the pixel switching element is connected to a corresponding one of the data lines and is brought into an electrical conduction state when a corresponding one of the scanning lines is selected. One end of the pixel capacitor is connected to the other end of the pixel switching element, and the other end of the pixel capacitor forms a common electrode. The storage capacitor is connected between the one end of the pixel capacitor and the capacitor line arranged in a position corresponding to that of the corresponding one of the scanning lines. The scanning line driving circuit sequentially selects the scanning lines in a predetermined order. The capacitor line driving circuit supplies a first capacitive signal to the capacitor line provided at a position corresponding to that of one scanning line when the one scanning line is selected, and changes a voltage applied to the one scanning line by a predetermined value when a scanning line, located a predetermined number of scanning lines away from the one scanning line, is selected. The first capacitive signal output circuit adjusts and outputs a voltage of the first capacitive signal so that a first target voltage is applied to the capacitor line corresponding to the one scanning line when the one scanning line is selected. The data line driving circuit supplies the pixels corresponding to the selected scanning line with data signals of voltages corresponding to gray scale levels of the pixels through the data lines.

According to the first aspect of the invention, a voltage applied to one capacitor line changes from the time when one scanning line corresponding to the one capacitor line is selected to the time when a scanning line, located a predetermined number of scanning lines away from the one scanning line, is selected. At the same time, electric charge stored in the storage capacitor is redistributed, so that the holding voltage of the pixel capacitor becomes equal to or more than a data signal voltage. Furthermore, a voltage applied to the one capacitor line is adjusted to the first target voltage. Thus, it is possible to suppress the amplitudes of voltages applied to the data lines while avoiding a complex configuration of the capacitor line driving circuit and also to reduce adverse effects on display due to fluctuation in voltages applied to the capacitor lines.

In the first aspect of the invention, the first capacitive signal output circuit may buffer the first target voltage during a first period closer to the beginning of a period during which the one scanning line is selected, and may execute a negative feedback control so that a voltage applied to the capacitor line becomes the first target voltage during a second period closer to the end of the period during which the one scanning line is selected.

In addition, in the first aspect of the invention, the capacitor line driving circuit may connect the one capacitor line to a first power feed line that supplies the first capacitive signal when the scanning line corresponding to the one capacitor line is selected, and may connect the one capacitor line to a second power feed line that supplies a second capacitive signal when the scanning line, located a predetermined number of scanning lines away from the one scanning line, is selected. Alternatively, the capacitor line driving circuit may include first and second transistors, both of which are provided in correspondence with the corresponding one of the capacitor lines, wherein a gate electrode of the first transistor corresponding to one capacitor line is connected to the scanning line corresponding to the one capacitor line and a source electrode of the first transistor is connected to a first power feed line that supplies a first capacitive signal, wherein a gate electrode of the second transistor is connected to the scanning line located a predetermined number of scanning lines away from the one scanning line and a source electrode of the second transistor is connected to a second power feed line that supplies a second capacitive signal, and wherein drain electrodes of the first transistor and the second transistor are commonly connected to the one capacitor line. In these configurations, the driving circuit may further include a second capacitive signal output circuit that outputs the second capacitive signal to the second power feed line so that a voltage applied to the capacitor line becomes a second target voltage when the scanning line, located a predetermined number of scanning lines away from the one scanning line, is selected.

On the other hand, in the first aspect of the invention, the driving circuit may further include a detection line that is connected through a capacitor to the capacitor line provided in correspondence with the one scanning line, wherein the first capacitive signal output circuit outputs the first capacitive signal so as to cancel a noise component that appears in the detection line during a period when the one scanning line is selected.

Moreover, in the first aspect of the invention, the capacitor line driving circuit may connect the one capacitor line to a first power feed line that supplies the first capacitive signal when the scanning line corresponding to the one capacitor line is selected, and may connect the one capacitor line to a second power feed line that supplies a second capacitive signal from the time when the scanning line, located a predetermined number of scanning lines away from the one scanning line, is selected to the time when the scanning line corresponding to the one capacitor line is selected again. Alternatively, the capacitive line driving circuit may include first through fourth transistors, all of which are provided in correspondence with the corresponding one of the capacitor lines, wherein a gate electrode of the first transistor corresponding to the one capacitor line is connected to the scanning line corresponding to the one capacitor line and a source electrode of the first transistor is connected to a first power feed line that supplies the first capacitive signal, wherein a source electrode of the second transistor is connected to a second power feed line that supplies a second capacitive signal, wherein a gate electrode of the third transistor is connected to the scanning line corresponding to the one capacitor line and a source electrode of the third transistor is connected to an off voltage feed line that supplies an off voltage for turning off the second transistor, wherein a gate electrode of the fourth transistor is connected to the scanning line located a predetermined number of scanning lines away from the one scanning line and a source electrode of the fourth transistor is connected to an on voltage feed line that supplies an on voltage for turning on the second transistor, wherein drain electrodes of the third and fourth transistors are commonly connected to the gate electrode of the second transistor, and wherein drain electrodes of the first and second transistors are connected to the one capacitor line.

A second aspect of the invention provides an electro-optical device that includes the components of the driving circuit according to the first aspect. Furthermore, a third aspect of the invention provides an electronic apparatus that includes the components of the electro-optical device.

BRIEF DESCRIPTION OF THE DRAWINGS

The invention will be described with reference to the accompanying drawings, wherein like numbers reference like elements.

FIG. 12 is a voltage waveform diagram illustrating the third alternative operation.

FIG. 13A and FIG. 13B are views showing a relationship between a data signal and a holding voltage in the third alternative operation.

DESCRIPTION OF EXEMPLARY EMBODIMENTS

Hereinafter, exemplary embodiments of the invention will be described with reference to the accompanying drawings.

First Embodiment

Figure 1:
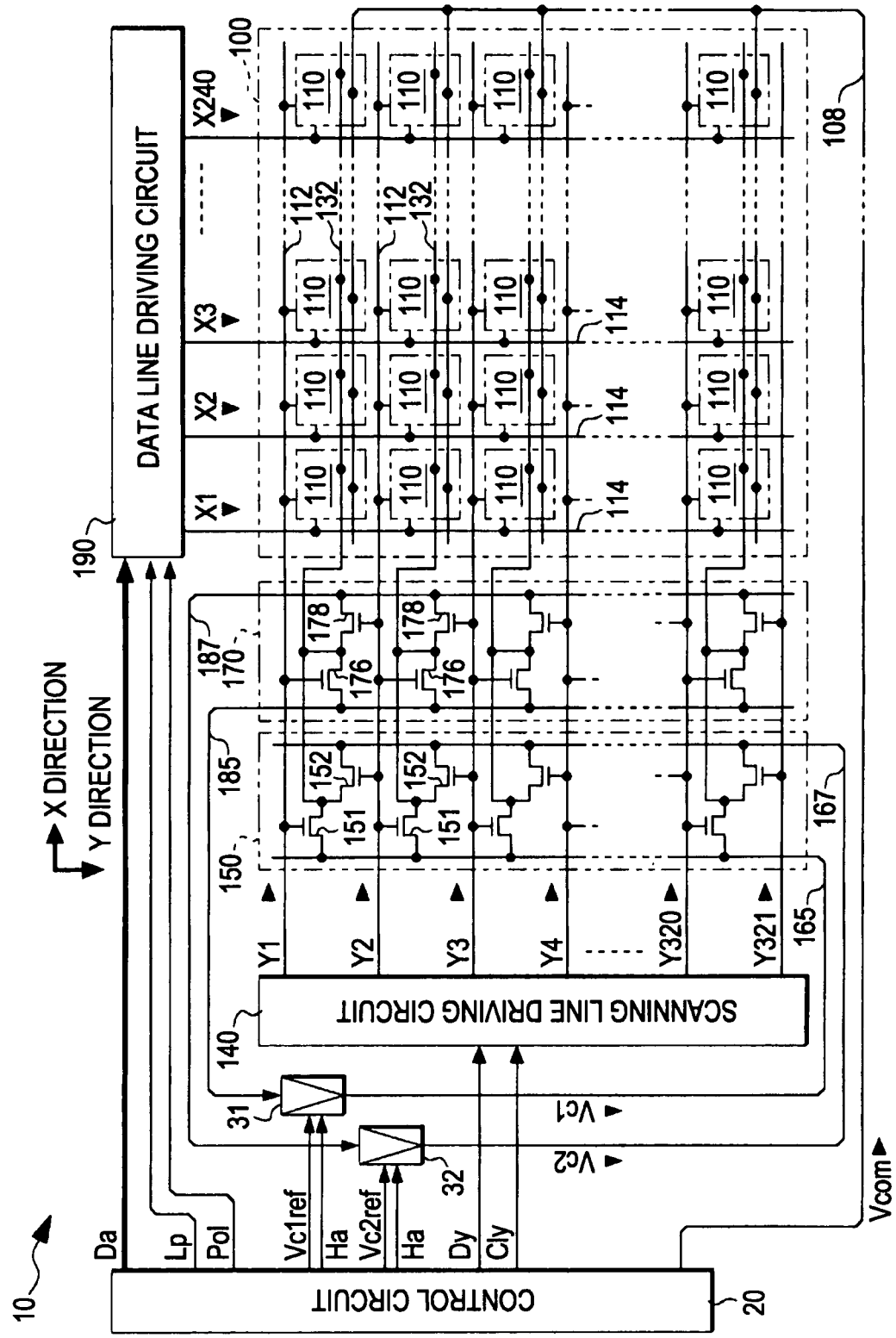
FIG. 1 is a view showing a configuration of an electro-optical device according to a first embodiment of the invention.

A first embodiment of the invention will now be described. FIG. 1 is a block diagram showing a configuration of an electro-optical device according to the first embodiment of the invention. As shown in the drawing, the electro-optical device 10 has a panel structure of peripheral circuit built-in type. The electro-optical device 10 includes a display area 100, a scanning line driving circuit 140, a capacitor line driving circuit 150, a detection circuit 170 and a data line driving circuit 190. These circuits 140, 150, 170, 190 are arranged around the display area 100. In addition, a control circuit 20, a first capacitive signal output circuit 31 and a second capacitive signal output circuit 32 form a circuit module, which is connected to the peripheral circuit built-in type panel by means of, for example, an FPC (flexible printed circuit) substrate.

The display area 100 is an area in which pixels 110 are arranged. In this embodiment, 321 scanning lines 112 (from first to 321st) are formed so as to extend in a horizontal (X) direction, while 240 data lines 114 are formed so as to extend in a vertical (Y) direction. Then, the pixels 110 are arranged at positions corresponding to intersections of the first to 320th scanning lines 112, in which the lowermost 321st scanning line 112 in FIG. 1 is excluded, and the first to 240th data lines 114. Thus, the pixels 110 are arranged in the display area 100 in a matrix of 320 rows by 240 columns, but this aspect of the invention is not intended to be limited to this pixel arrangement. The 321st scanning line 112 does not have a pixel 110 corresponding thereto and, therefore, it serves as a dummy scanning line. That is, the 321st scanning line 112 does not contribute to writing a voltage to the pixels 110 if it is selected while vertical scanning of the display area 100 (operation for sequentially selecting the scanning lines in order) is being performed. In addition, capacitor lines 132 are formed in correspondence with the first to 320th scanning lines 112 so as to extend in the X direction. For this reason, in the present embodiment, the capacitor lines 132 are formed in correspondence with the first to 320th scanning lines 112, other than the 321st dummy scanning line 112.

Figure 2:
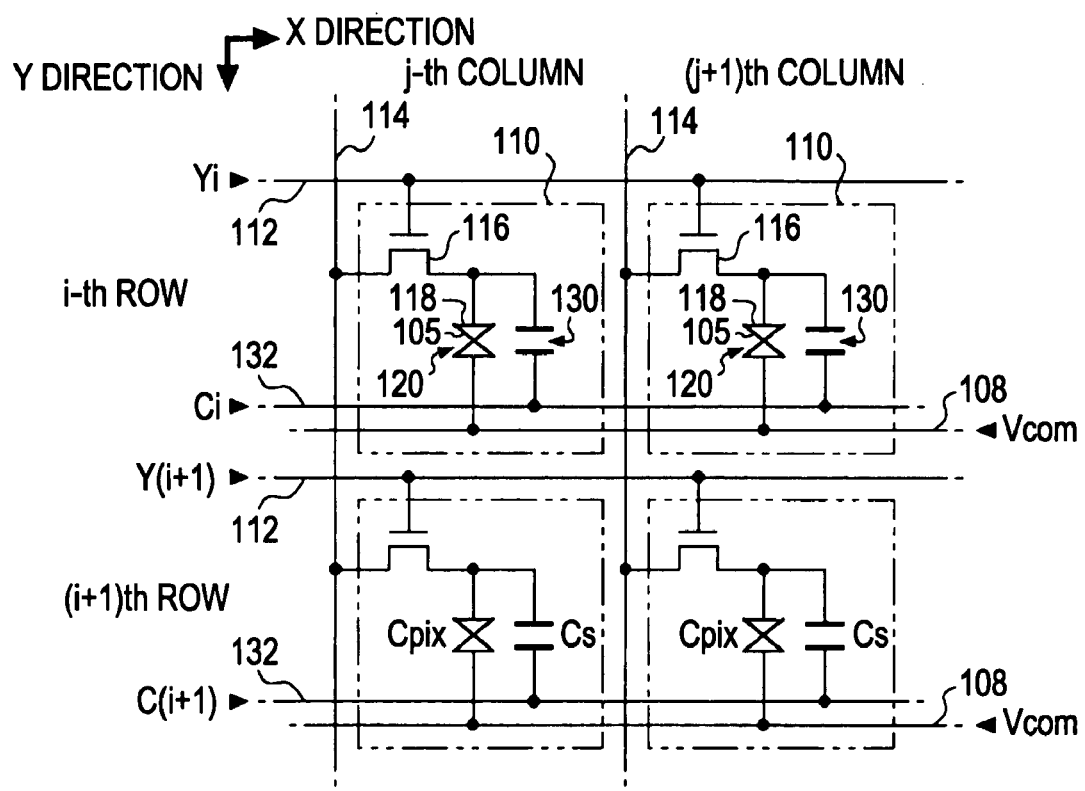
FIG. 2 is a view showing pixels in the electro-optical device.

Here, a configuration of each pixel 110 will be described in detail. FIG. 2 is a view showing a configuration of the pixels 110, specifically illustrating a configuration of four pixels arranged in a two by two matrix, which correspond to intersections of the i-th row, the (i+1)th row next to and below the i-th row, the j-th column, and the (j+1)th column next to and to the right of the j-th column. Note that symbols "i" and "(i+1)" generally indicate rows in which the pixels 110 are arranged and are integers ranging from 1 to 320, and symbols "j" and "(j+1)" generally indicate columns in which the pixels 110 are arranged and are integers ranging from 1 to 240. Here, when rows in which the pixels 100 are arranged are generally indicated, "i" and "(i+1)" are integers ranging from 1 to 320. However, when rows of pixels corresponding to the scanning lines 112 are described, "i" and "(i+1)" are integers ranging from 1 to 321 because the dummy scanning line corresponding to the 321st row needs to be included.

As shown in FIG. 2, each of the pixels 110 includes an n-channel thin-film transistor (hereinafter, simply referred to as "TFT") 116 which serves as a pixel switching element, a pixel capacitor (a liquid crystal capacitor) 120 and a storage capacitor 130. Because the pixels 110 have the same configurations with respect to each other, the pixel 110 located at the i-th row and the j-th column will be described as an example. In the pixel 110 at the i-th row and the j-th column, the gate electrode of the TFT 116 is connected to the i-th row scanning line 112, the source electrode of the TFT 116 is connected to the j-th column data line 114, and the drain electrode of the TFT 116 is connected to a pixel electrode 118 which is one end of the pixel capacitor 120. In addition, the other end of the pixel capacitor 120 is a common electrode 108. The common electrode 108 is, as shown in FIG. 1, common to all the pixels 110 and is supplied with a common signal Vcom. Note that, in the present embodiment, the common signal Vcom is temporally constant at a voltage LCcom, which will be described later. Note that, in FIG. 2, Yi and Y(i+1) respectively indicate scanning signals supplied to the i-th and (i+1)th scanning lines 112, and Ci and C(i+1) respectively indicate voltages applied to the i-th and (i+1)th capacitor lines 132.

The display area 100 is configured so that a pair of an element substrate on which the pixel electrodes 118 are formed and an opposing substrate on which the common electrode 108 is formed are adhered to each other with a certain gap therebetween in such a manner that the electrode forming surfaces are opposite each other and a liquid crystal 105 is sealingly placed in the gap. Thus, each of the pixel capacitors 120 is formed so that the liquid crystal 105, which is a dielectric material, is held between the pixel electrode 118 and the common electrode 108, and each of the pixel capacitors 120 is configured to hold a difference in voltage between the pixel electrode 118 and the common electrode 108. With this configuration, the amount of transmissive light varies in accordance with an effective value of the voltage held by the pixel capacitor 120. Note that, for the purpose of easy description, the present embodiment employs a normally white mode display, in which the transmittance ratio of light becomes maximal to perform white display the closer an effective value of the voltage held by the pixel capacitor 120 is to zero, while the amount of transmissive light is reduced the larger an effective value of the voltage is, and finally to perform black display when the transmittance ratio becomes minimal.

One end of the storage capacitor 130 of the i-th row and the j-th column pixel 110 is connected to the pixel electrode 118 (the drain electrode of the TFT 116), and the other end thereof is connected to the i-th capacitor line 132. Here, the capacitance of the pixel capacitor 120 is Cpix and the capacitance of the storage capacitor 130 is Cs.

Referring back to FIG. 1, the control circuit 20 outputs various control signals to execute various controls of the portions in the electro-optical device 10. The control circuit 20 also supplies a first target signal Vc1ref and a period specifying signal Ha to the first capacitive signal output circuit 31 and supplies a second target signal Vc2ref and a period specifying signal Ha to the second capacitive signal output circuit 32. The control circuit 20 further supplies a common signal Vcom to the common electrode 108. The peripheral circuits, such as the scanning line driving circuit 140, the capacitor line driving circuit 150, the detection circuit 170 and the data line driving circuit 190, are provided around the display area 100, as described above.

Figure 5:
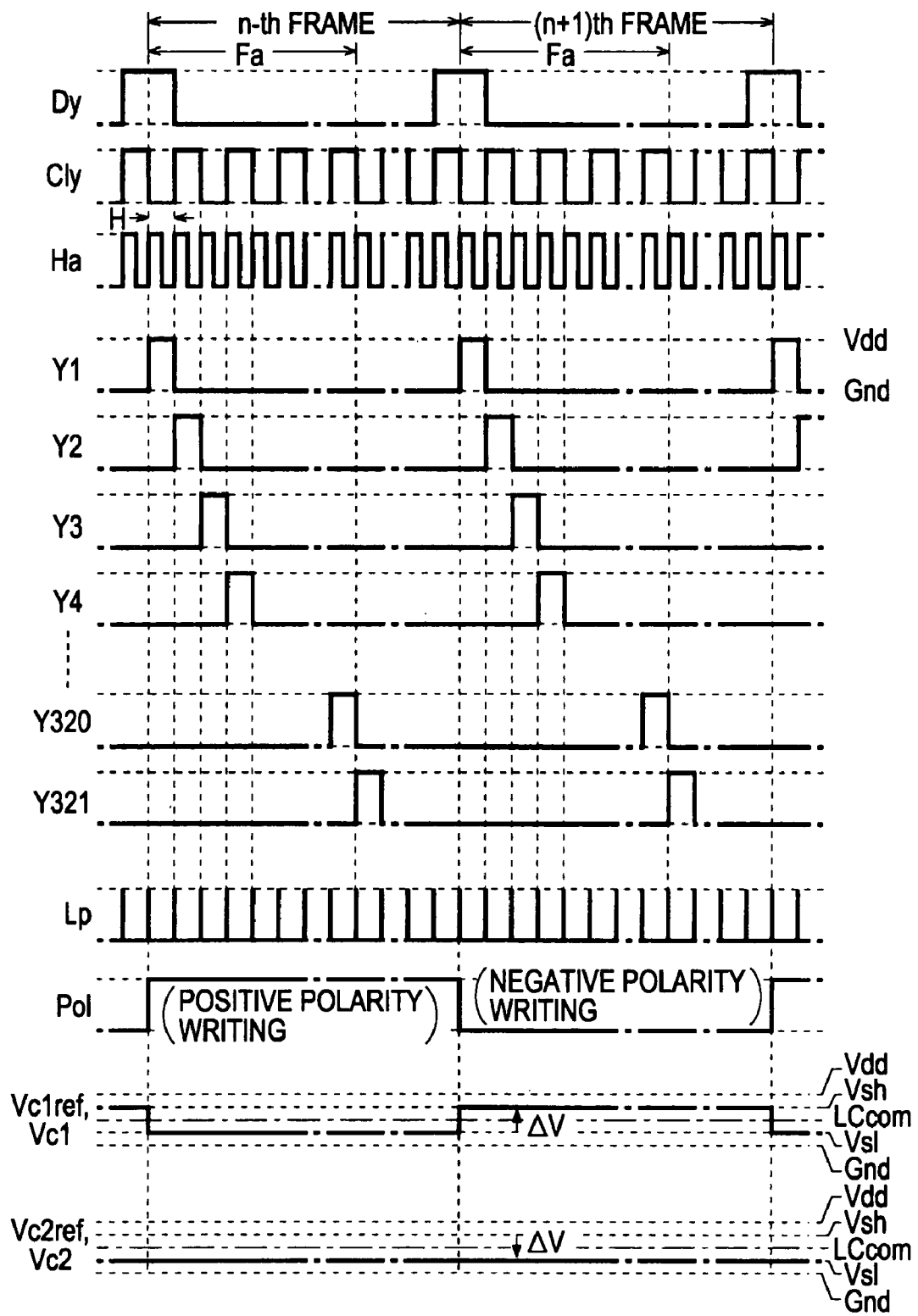
FIG. 5 is a view illustrating the operation of the electro-optical device.

Of these circuits, the scanning line driving circuit 140 supplies scanning signals Y1, Y2, Y3, . . . , Y320, and Y321 to the first, second, third, . . . , 320th, and 321st scanning lines 112 over a period of one frame in accordance with the control executed by the control circuit 20. Specifically, the scanning line driving circuit 140 sequentially selects the scanning lines 112 in the order of, from the upper side in FIG. 1, first, second, third, . . . , 320th, and 321st, and sets a scanning signal for the selected scanning line to an H level corresponding to a selected voltage vdd and sets scanning signals for the other scanning lines to an L level corresponding to a non-selected voltage (a ground potential Gnd). Note that the scanning line driving circuit 140, as shown in FIG. 5, sequentially shifts a start pulse Dy supplied from the control circuit 20 in accordance with a clock signal Cly and outputs the scanning signals Y1, Y2, Y3, Y4, . . . , Y320, and Y321 in the stated order. In addition, in the present embodiment, a period of one frame, as shown in FIG. 5, not only includes an effective scanning period Fa from the time when the scanning signal Y1 attains an H level to the time when the scanning signal Y320 attains an L level but also includes the other fly-back periods. Note that a period during which the scanning line 112 of one row is selected is a horizontal scanning period (H).

The capacitor line driving circuit 150, in the present embodiment, is formed of a set of n-channel TFTs 151, 152 provided in correspondence with each of the first to 320th capacitor lines 132. Here, the TFTs 151, 152 corresponding to the i-th capacitor line 132 will be described. The gate electrode of the TFT 151 (a first transistor) is connected to the i-th scanning line 112 and the source electrode of the TFT 151 is connected to a first power feed line 165, while the gate electrode of the TFT 152 (a second transistor) is connected to the (i+1)th scanning line 112 and the source electrode of the TFT 152 is connected to a second power feed line 167. Then, the drain electrodes of the TFTs 151, 152 are commonly connected to the i-th capacitor line 132. The detection circuit 170 is formed of a set of n-channel TFTs 176, 178 provided at a position corresponding to each of the first to 320th capacitor lines 132. Here, the TFTs 176, 178 corresponding to the i-th capacitor line 132 will be described. The gate electrode of the TFT 176 is connected to the i-th row scanning line 112 and the drain electrode of the TFT 176 is connected to a first detection line 185, while the gate electrode of the TFT 178 is connected to the (i+1)th row scanning line 112 and the drain electrode of the TFT 178 is connected to a second detection line 187. Then, the source electrodes of the TFTs 176, 178 are commonly connected to the i-th capacitor line 132.

In such a configuration, as the scanning signal Yi attains an H level by the selection of the i-th row scanning line 112, the i-th row TFT 151 turns on to connect the i-th capacitor line 132 to the first power feed line 165, and the i-th row TFT 176 turns on to connect the i-th capacitor line 132 to the first detection line 185. As the scanning signal Y(i+1) attains an H level by the selection of the next (i+1)th row scanning line 112, the i-th row TFT 151 turns off and the i-th row TFT 152 turns on to connect the i-th capacitor line 132 to the second power feed line 167, and the i-th row TFT 178 turns on to connect the i-th capacitor line 132 to the second detection line 187.

The first capacitive signal output circuit 31 will now be described with reference to FIG. 4. As shown in the drawing, the first capacitive signal output circuit 31 includes an operational amplifier 300, switches 311, 312, a NOT circuit 315 and a resistor 316. The output terminal of the operational amplifier 300 is connected to the first power feed line 165 and one end of the switch 311, and the first detection line 185 is connected to one end of the switch 312. Then, the other ends of the switches 311, 312 are each connected to the negative input terminal of the operational amplifier 300. On the other hand, the positive input terminal (+) of the operational amplifier 300 is supplied with the first target signal Vc1ref from the control circuit 20. In addition, the resistor 316 is connected between the output terminal and negative input terminal (−) of the operational amplifier 300. The switches 311, 312 exclusively turn on or off relative to each other in accordance with a logic level of the period specifying signal Ha that is set by the control circuit 20. Specifically, the switch 311 turns on when the period specifying signal Ha is at an H level, and the switch 312 turns on when a signal that is generated by inverting the logic level of the period specifying signal Ha with the NOT circuit 315 is at an H level. Because the period specifying signal Ha, as shown in FIG. 5, attains an H level during a first half period of the horizontal scanning period (H) and attains an L level during a second half period, the switch 311 is turned on and the switch 312 is turned off during the first half period of the horizontal scanning period (H), while, on the other hand, the switch 311 is turned off and the switch 312 is turned on during the second half period. The first power feed line 165 and the first detection line 185 are connected to each other through the i-th capacitor line 132 when the i-th row TFTs 151, 176 are turned on over a period during which the scanning signal Yi is at an H level. For this reason, the first capacitive signal output circuit 31 buffers a voltage of the first target signal Vc1ref during the first half period of the horizontal scanning period (H), while the first capacitive signal output circuit 31 outputs a first capacitive signal Vc1 for which a negative feedback control is performed so that a voltage of the first detection line 185 becomes a voltage of the first target signal Vc1ref during the second half period.

Figure 4:
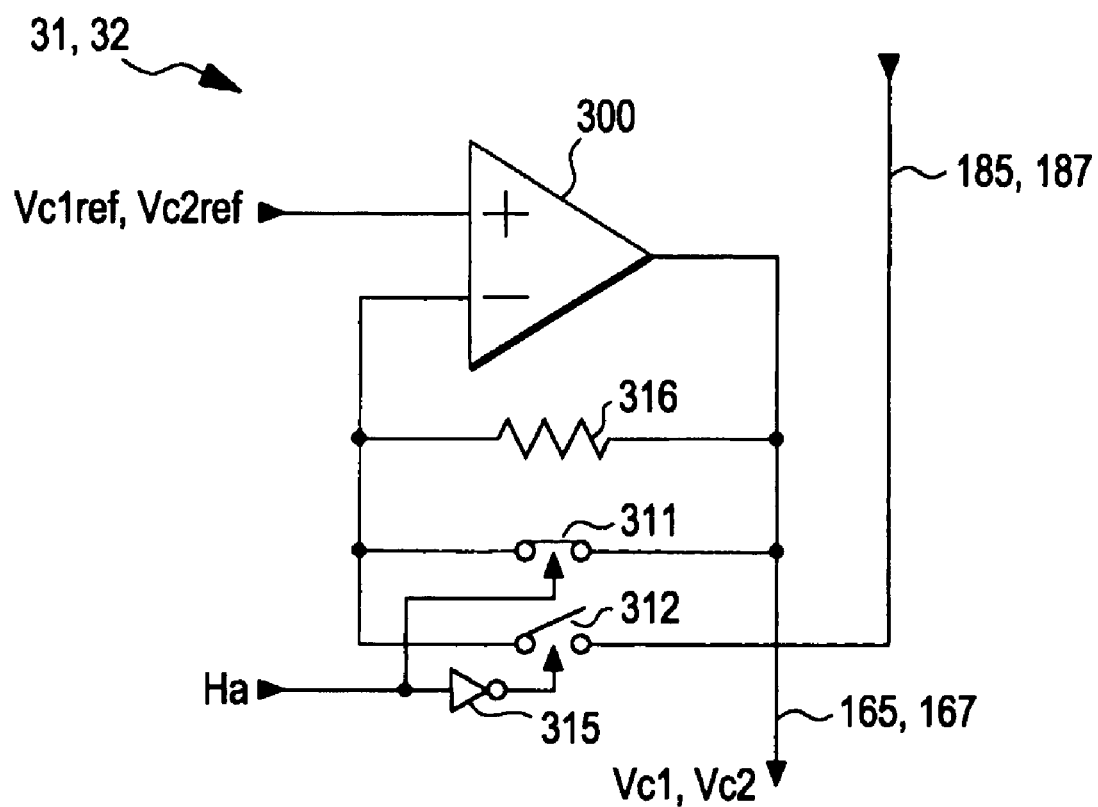
FIG. 4 is a view showing a configuration of a first (a second) capacitive signal output circuit of the electro-optical device.

On the other hand, the second capacitive signal output circuit 32 has the same configuration as the first capacitive signal output circuit 31 as indicated by the reference numerals in parenthesis shown in FIG. 4. The second power feed line 167 and the second detection line 187 are connected with each other through the i-th capacitor line 132 when the i-th row TFTs 152, 178 are turned on over a period during which the scanning signal Y(i+1) is at an H level. For this reason, the second capacitive signal output circuit 32 buffers a voltage of the second target signal Vc2ref during the first period of the horizontal scanning period (H), while the second capacitive signal output circuit 32 outputs a second capacitive signal Vc2 for which a negative feedback control is performed so that a voltage of the second detection line 187 becomes a voltage of the second target signal Vc2ref during the second half period. Note that the resistor 316 specifies the amount of feedback; however, during the buffering period it is preferable for the resistor 316 to have a lower resistance in terms of accuracy, or the like, and, therefore, both ends of the resistor 316 are short-circuited by the switch 311. If there is no problem in terms of accuracy, or the like, the switch 311 may be omitted.

If a noise, or the like, is not superposed, a voltage of the first capacitive signal Vc1 may be regarded as a voltage of the first target signal Vc1ref and, similarly, a voltage of the second capacitive signal Vc2 may be regarded as a voltage of the second target signal Vc2ref. Because of this, the i-th capacitor line 132 is applied with a voltage of the first target signal Vc1ref during a period when the scanning signal Yi is at an H level and is applied with a voltage of the second target signal Vc2ref during a period when the scanning signal Y(i+1) is at an H level. Note that the i-th capacitor line 132 is, during the other period, in a high impedance state where the i-th capacitor line 132 is not electrically connected to any other portions.

Referring back to FIG. 1, the data line driving circuit 190 executes operation to supply the data line 114 with a data signal of voltage corresponding to a polarity specified by a polarity specifying signal Pol as being converted from a voltage corresponding to a gray scale level of the pixel 110 that is located on the scanning line 112 selected by the scanning line driving circuit 140 for each of the first to 240th columns located on the selected scanning line 112. Here, the data line driving circuit 190 includes memory areas (not shown) corresponding to a matrix array of vertical 320 rows by horizontal 240 columns, and each of the memory areas stores display data Da that specifies a gray scale value (brightness) of the corresponding pixel 110. The display data Da stored in each memory area is updated by the modified display data Da supplied together with an address by the control circuit 20 when the display content needs to be changed. The data line driving circuit 190 reads out the display data Da for the pixels 110 located on the selected scanning line 112 from the memory areas and supplies the data lines 114 with data signals of voltages corresponding to a specified polarity as being converted from voltages corresponding to gray-scale levels specified by the read display data.

The polarity specifying signal Pol is a signal that specifies a positive polarity writing when in an H level and that specifies a negative polarity writing when in an L level. In the present embodiment, as shown in FIG. 5, the same level is maintained during one frame. Thus, the present embodiment employs a surface inversion drive method in which a writing polarity for the pixels is the same over a period of one frame. In addition, the polarity specifying signal Pol is logically inverted every period of one frame. The reason why a writing polarity is so inverted is to prevent degradation of liquid crystal due to a direct current component applied thereto. Further, the voltage of the first target signal Vc1ref becomes a voltage Vsl when the polarity specifying signal Pol is at an L level and becomes a voltage Vsh when the polarity specifying signal Pol is at an H level. On the other hand, in the present embodiment, the second target signal Vc2ref is constant at the voltage Vsl, irrespective of the logic level of the polarity specifying signal Pol. Note that, in the present embodiment, a difference between the voltage Vsl and the voltage Vsh is defined as ΔV. Here, as regards a writing polarity in the present embodiment, it is defined as a positive polarity in a case where the voltage of the pixel electrode 118 is higher than the voltage LCcom of the common electrode 108 and it is defined as a negative polarity in a case where the voltage of the pixel electrode 118 is lower than the voltage LCcom of the common electrode 108 when the pixel capacitor 120 holds a voltage corresponding to a gray-scale level. As regards a voltage, unless otherwise specified, the ground potential Gnd of a power source corresponds to a logical L level and is used as a reference of zero voltage.

Note that the control circuit 20 supplies the data line driving circuit 190 with a latch pulse Lp at a timing when the logic level of a clock signal is changed. As described above, the scanning line driving circuit 140 sequentially shifts the start pulse Dy in accordance with the clock signal Cly and outputs the scanning signals Y1, Y2, Y3, Y4, . . . , Y320, and Y321, so that the start timing of a period during which each of the scanning lines is selected is a timing when the logic level of the clock signal Cly is changed. Thus, the data line driving circuit 190 is able to acquire which row scanning line is selected by continuing to count the latch pulses Lp over a period of one frame and to acquire a start timing of the selection owing to a supply timing of the latch pulse Lp.

Note that in the present embodiment, in addition to the scanning lines 112, the data lines 114, the TFT 116, the pixel electrode 118 and the storage capacitor 130 in the display area 100, the TFTs 151, 152, the first power feed line 165 and the second power feed line 167 in the capacitor line driving circuit 150, and the TFTs 176, 178, the first detection line 185 and the second detection line 187 in the detection circuit 170 are also formed on the element substrate.

Figure 3:
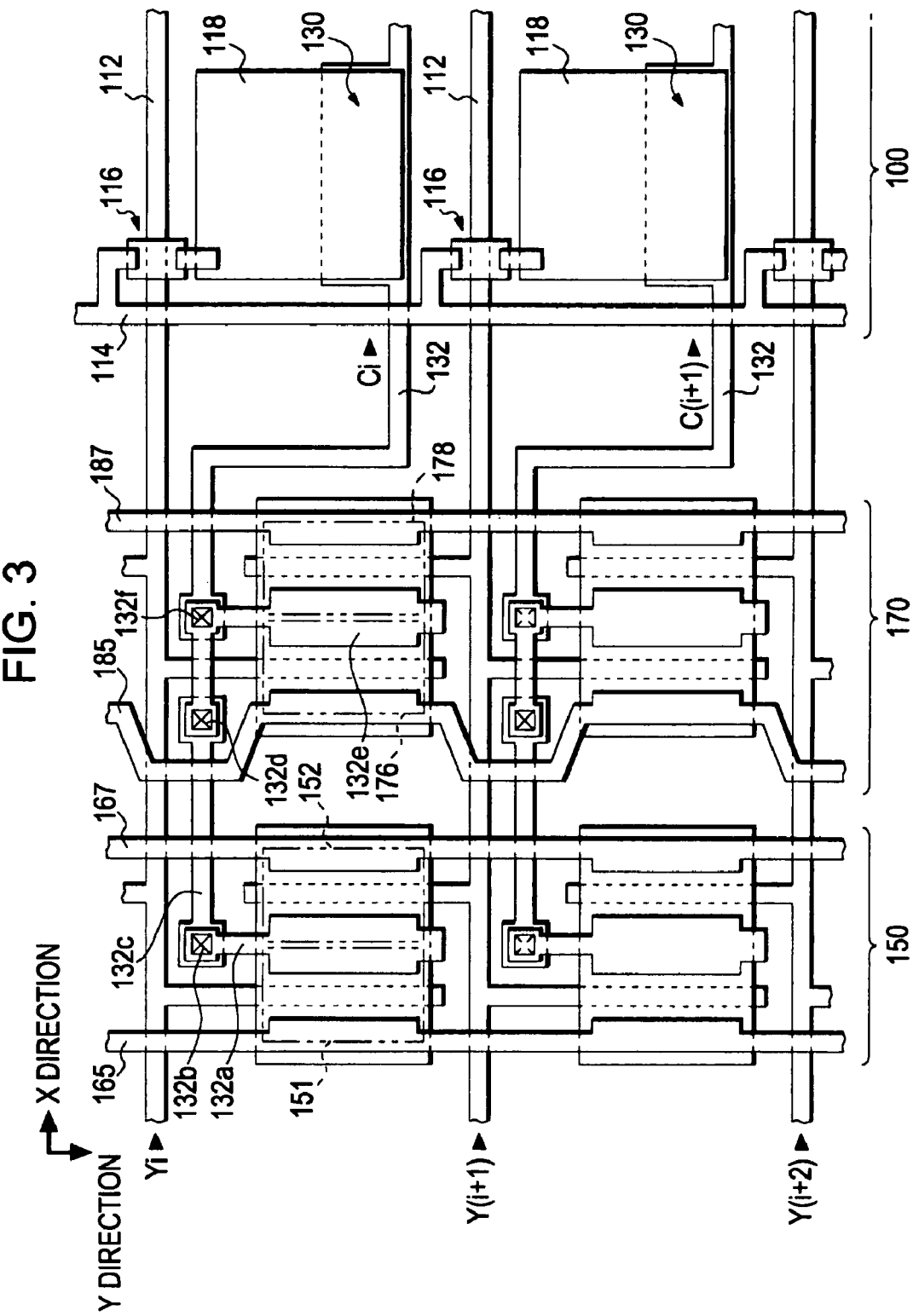
FIG. 3 is a view showing a peripheral configuration of a display area of the electro-optical device.

FIG. 3 is a plan view of such an element substrate, showing a configuration of the capacitor line driving circuit 150, detection circuit 170 and peripheral portions of the display area 100. As shown in the drawing, in the present embodiment, the TFTs 116, 151, 152, 176, 178 are of the amorphous silicon type and are of the bottom gate type in which the gate electrode is formed below the semiconductor layer. Specifically, the scanning lines 112 and the capacitor lines 132 are formed by patterning a gate electrode layer which is a first conductive layer, and a gate insulation film (not shown) is formed on the gate electrode layer. Further, the semiconductor layers of the TFTs 116, 151, 152, 176, 178 are formed in an island shape. On these semiconductor layers, an ITO (indium tin oxide) layer, which is a second conductive layer, is patterned via a protection layer to form the pixel electrodes 118 which are rectangular and transparent, and a metal layer made of aluminum, or the like, which is a third conductive layer, is further patterned to form the source and drain electrodes of the TFTs 116, 151, 152, 176, 178, the data lines 114, the first power feed line 165, the second power feed line 167, the first detection line 185, the second detection line 187, or the like.

Here, in the capacitor line driving circuit 150, the gate electrode of the TFT 151 corresponding to the i-th row is a T-shaped portion that is branched from the i-th row scanning line 112 in the Y (downward) direction, and, similarly, the gate electrode of the TFT 152 corresponding to the i-th row is a T-shaped portion that is branched from the (i+1)th row scanning line 112 in the Y (upward) direction. In addition, in the detection circuit 170, the gate electrode of the TFT 176 corresponding to the i-th row is a T-shaped portion that is branched from the i-th row scanning line 112 in the Y (downward) direction and, similarly, the gate electrode of the TFT 178 corresponding to the i-th row is a T-shaped portion that is branched from the (i+1)th row scanning line 112 in the Y (upward) direction. The drain electrode 132a of the TFTs 151, 152 corresponding to the i-th row is formed by patterning the third conductive layer. The drain electrode 132a passes through a contact hole (the symbol x in FIG. 3) 132b, which is formed through the gate insulation film and the protection layer, and is then connected to a wiring line 132c in which the gate electrode layer is patterned. On the other hand, the source electrode 132e of the i-th row TFTs 176, 178 is formed by patterning the third conductive layer. The source electrode 132e is connected through a contact hole 132d to the wiring line 132c, while, on the other hand, the source electrode 132e is connected through a contact hole 132f to the i-th capacitor line 132. Meanwhile, in the display area 100, each of the storage capacitors 130 is formed so that the gate insulation film is held as a dielectric between the pixel electrode 118 and a wide portion of the capacitor line 132, which is formed in the lower side layer in correspondence with the pixel electrode 118. For this reason, the other end of the storage capacitor 130 becomes a portion of the capacitor line 132. Note that the common electrode 108 opposite the pixel electrode 118 is formed on the opposite substrate and, hence, it is not shown in FIG. 3 that shows a plan view of the element substrate.

FIG. 3 shows an example of the configuration. As regards the type of thin-film transistor used, other structures are applicable. For example, a top-gate-type thin-film transistor is applicable in terms of the arrangement of a gate electrode, and a polysilicon-type thin-film transistor is applicable in terms of the process used. Furthermore, it is applicable that an IC chip is mounted on the element substrate side, instead of integrating the elements of the capacitor line driving circuit 150 and detection circuit 170 onto the substrate in the same process for the display area 100. When an IC chip is mounted on the element substrate side, the scanning line driving circuit 140, the capacitor line driving circuit 150 and the detection circuit 170 may be formed as one semiconductor chip together with the data line driving circuit 190, or may be formed as separate semiconductor chips independent of each other. Further, the control circuit 20 may be integrated onto the element substrate together with the first capacitive signal output circuit 31 and the second capacitive signal output circuit 32. Moreover, when the present embodiment is applied to a reflective-type liquid crystal display panel instead of a transmissive-type liquid crystal display panel, a reflective conductive layer may be patterned to form the pixel electrode 118 or an additional reflective metal layer may be formed. A so-called transflective-type liquid crystal display panel, in which the transmissive-type liquid crystal display panel and the reflective type liquid crystal display panel are combined, is also applicable.

The operation of the electro-optical device 10 according to the present embodiment will now be described. As described above, the present embodiment employs a surface inversion drive method in which the writing polarity of each pixel is the same over a period of one frame. For this reason, as shown in FIG. 5, the control circuit 20 specifies a positive polarity writing by setting the polarity specifying signal Pol to an H level during a period of one frame (indicated as "n-th frame") and specifies a negative polarity writing by setting the polarity specifying signal Pol to an L level during a period of the next (n+1)th frame, thus continuing to invert a writing polarity every period of one frame in the same manner.

First, in the n-th frame, the control circuit 20 sets the first target signal Vc1ref and the second target signal Vc2ref to the same voltage Vsl. In addition, in the n-th frame, the scanning line driving circuit 140 initially sets the scanning signal Y1 to an H level. On the other hand, as the latch pulse Lp is output at the timing when the scanning signal Y1 attains an H level, the data line driving circuit 190 reads out the display data Da for the first, second, third, . . . , 240th column pixels in the first row and supplies the corresponding first, second, third, . . . , 240th column data lines 114 with data signals X1, X2, x3, X240 of voltages which are converted to a level higher than the reference voltage LCcom by amounts specified by the display data Da. In this manner, for example, a positive polarity voltage that is set to a level higher than the voltage LCcom by an amount specified by the display data Da for the first row and j-th column pixel 110 is applied to the j-th column data line 114 as a data signal Xj. Then, as the scanning signal Y1 attains an H level, the TFTs 116 of the pixels of the first row and first column to the first row and 240th column turn on. Thus, the data signals X1, X2, X3, . . . , X240 are applied to the pixel electrodes 118 of these pixels. For this reason, positive polarity voltages corresponding to the gray-scale levels are written to the pixel capacitors 120 of the first row and first column to the first row and 240th column. On the other hand, when the scanning signal Y1 is an H level, the TFT 151 corresponding to the first row is turned on but the TFT 152 is turned off (because the scanning signal Y2 is at an L level) in the capacitor line driving circuit 150, so that the first capacitor line 132 is connected to the first power feed line 165 to be applied with the voltage Vsl. For this reason, differential voltages between the positive polarity voltages corresponding to the respective gray-scale levels and the voltage Vsl are written into the corresponding storage capacitors 130 of the first row and first column to the first row and 240th column.

Subsequently, the scanning signal Y1 attains an L level, and the scanning signal Y2 attains an H level. As the scanning signal Y1 attains an L level, the TFTs 116 of the pixels of the first row and first column to the first row and 240th column turn off. In addition, when the scanning signal Y1 is at an L level and the scanning signal Y2 is at an H level, the TFT 151 corresponding to the first row is turned off and the TFT 152 corresponding to the first row is turned on in the capacitor line driving circuit 150. Thus, the first capacitor line 132 is connected to the second power feed line 167, but, in the n-th frame during which a positive polarity writing is specified, the electric potential of the first capacitor line 132 does not change because the second power feed line 167 is applied with the same voltage Vsl as the first power feed line 165. Hence, when the polarity specifying signal Pol is at an H level and the positive polarity writing is specified, even when the scanning signal Y2 attains an H level, voltages, with which the pixel capacitors 120 and storage capacitors 130 of the first row and first column to the first row and 240th column are applied, do not change.

On the other hand, as the latch pulse Lp is output at the timing when the scanning signal Y2 attains an H level, the data line driving circuit 190 supplies the first, second, third, . . . , 240th column data lines 114 with the data signals X1, X2, X3, . . . , X240 of positive polarity voltages corresponding to gray-scale levels of the first, second, third, . . . , 240th column pixels in the second row. As the scanning signal Y2 attains an H level, the TFTs 116 of the pixels of the second row and first column to the second row and 240th column turn on, so that the data signals X1, X2, X3, . . . , X240 are applied to the pixel electrodes 118 of the pixels. As a result, positive polarity voltages corresponding to the gray-scale levels are written into the pixel capacitors 120 of the second row and first column to the second row and 240th column. Note that, when the scanning signal Y2 is at an H level, the TFT 151 corresponding to the second row is turned on but the TFT 152 corresponding to the second row is turned off (because the scanning signal Y3 is at an L level) in the capacitor line driving circuit 150, so that the voltage Vsl is applied to the second capacitor line 132. For this reason, differential voltages between the positive polarity voltages corresponding to the gray-scale levels and the voltage Vsl are written into the storage capacitors 130 of the second row and first column to the second row and 240th column.

Next, the scanning signal Y2 attains an L level, and the scanning line Y3 becomes an H level. As the scanning signal Y2 attains an L level, the TFT 151 corresponding to the first row has been turned off and the TFT 152 corresponding to the first row also turns off in the capacitor line driving circuit 150, the first capacitor line 132 is brought into a high impedance state. However, owing to the parasitic capacitance, the first capacitor line 132 is held at the voltage Vsl that is applied immediately before the turning off of the TFT 152, so that voltages held by the pixel capacitors 120 and storage capacitors 130 of the first row and first column to the first row and 240th column do not change afterward. Consequently, the first row and first column to the first row and 240th column pixel capacitors 120 each continues to hold a differential voltage between a data signal voltage that has been applied to the pixel electrode 118 when the scanning signal Y1 attained an H level and the voltage LCcom of the common electrode 108, that is, a voltage corresponding to the gray-scale level. In addition, as the latch pulse Lp is output at the timing when the scanning signal Y3 attains an H level, the data line driving circuit 190 supplies the first, second, third, . . . , 240th column data lines 114 with the data signals X1, X2, X3, . . . , X240 of positive polarity voltages corresponding to the gray-scale levels of the first, second, third, . . . , 240th column pixels of the third row. In this manner, the positive polarity voltages corresponding to the gray-scale levels are written into the pixel capacitors 120 of the third row and first column to the third row and 240th column. Note that, when the scanning signal Y3 is at an H level, the TFT 151 corresponding to the third row is turned on but the TFT 152 corresponding to the third row is in an off state (because the scanning signal Y4 is at an L level) in the capacitor line driving circuit 150, so that the voltage Vsl is applied to the third capacitor line 132. Hence, differential voltages between the positive polarity voltages corresponding to the gray-scale levels and the voltage Vsl are written into the storage capacitors 130 of the third row and first column to the third row and 240th column.

During a period of the n-th frame when the polarity specifying signal Pol is at an H level, the same operation will continue until the scanning signal Y321 attains an H level. By so doing, all the pixel capacitors 120 hold differential voltages between data signal voltages applied to the pixel electrode 118 and the voltage LCcom of the common electrode 108 and emit light with gray-scale levels corresponding to the voltages being held by the pixel capacitors 120.

The operation of the control circuit 20 during the (n+1)th frame when the polarity signal Pol is at an L level will now be described. The operation during the (n+1)th frame differs from the operation during the n-th frame mainly in the following two points. That is, firstly, the control circuit 20 sets the first target signal Vc1ref to a voltage Vsh that is higher than the voltage Vsl by ΔV, as shown in FIG. 5, and, secondly, as the latch pulse Lp is output at the timing when the scanning signal Yi attains an H level, the data line driving circuit 190 reads out the display data Da of the first, second, third, . . . , 240th column pixels in the i-th row as in the case of the operation during the n-th frame. However, considering that the data line driving circuit 190 sets voltages corresponding to the display data Da and negative polarity (which will be described later) as the data signals X1, X2, X3, . . . , X240, the operation during the (n+1)th frame differs from the operation during the n-th frame. Then, as regards the operation during the (n+1)th frame, a description will be given focusing on these differences in light of how the voltage that is written into the i-th row and j-th column pixel capacitor 120 when the scanning signal Yi is at an H level changes when the scanning signal Y(i+1) attains an H level.

Figure 6A:
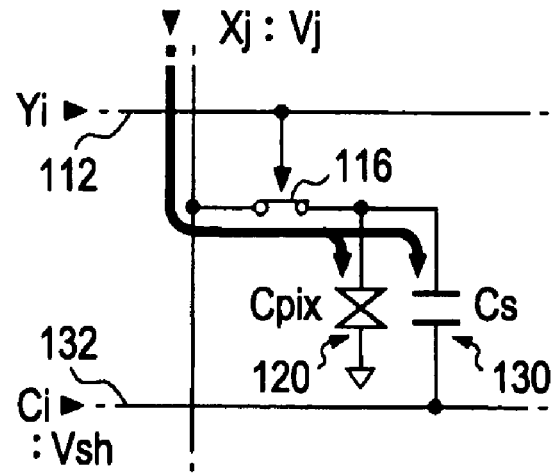
FIG. 6A and FIG. 6B are views showing a state where the electro-optical device executes a negative polarity writing.
Figure 6B:
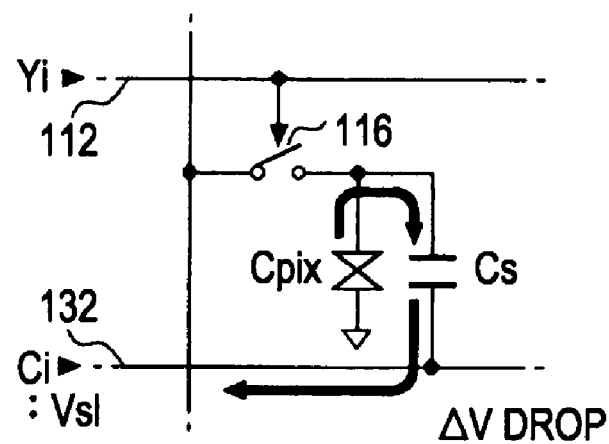

FIGS. 6A and 6B are views illustrating a change in voltage held by the i-th row and j-th column pixel capacitor 120 during the (n+1)th frame. First, as the scanning signal Yi attains an H level, the ith-row and j-th column TFT 116 turns on, as shown in FIG. 6A. Thus, the data signal Xj is applied between one end (pixel electrode 118) of the pixel capacitor 120 and one end of the storage capacitor 130. On the other hand, when the scanning signal Yi is at an H level, the TFT 151 corresponding to the i-th row is turned on and the i-th row TFT 152 maintains an off state in the capacitor line driving circuit 150. Thus, a voltage Ci of the i-th capacitor line 132 becomes the voltage Vsh of the first power feed line 165. Note that the common electrode 108 is constant at the voltage LCcom. Accordingly, when a voltage of the data signal Xj at this time is denoted by Vj, the i-th row and j-th column pixel capacitor 120 is charged with a voltage (Vj−LCcom) and the i-th row and j-th column storage capacitor 130 is charged with a voltage (Vj−Vsh).

Next, as the scanning signal Yi attains an L level, the i-th row and j-th column TFT 116 turns off, as shown in FIG. 6B. In addition, as the scanning signal Yi attains an L level, the next scanning signal Y(i+1) attains an H level (the (i+1)th row is not shown in FIG. 6B). As a result, the TFT 151 corresponding to the i-th row turns off and the TFT 152 corresponding to the i-th row turns on in the capacitor line driving circuit 150. For this reason, the voltage Ci of the i-th capacitor line 132 becomes the voltage Vsl of the second power feed line 167. In comparison with the voltage of the scanning signal Yi when it is at an H level, the voltage is decreased by a voltage ΔV, but the common electrode 108 is constantly held at the voltage LCcom. Thus, because the electric charge stored in the pixel capacitor 120 is moved to the storage capacitor 130, the voltage of the pixel electrode 118 decreases. Specifically, in a series connection of the pixel capacitor 120 and the storage capacitor 130, the end of the storage capacitor 130 not connected to the pixel capacitor 120 decreases by a voltage ΔV while the end (common electrode) of the pixel capacitor 120 not connected to the storage capacitor 130 is maintained at a constant voltage, so that the voltage of the pixel electrode 118 also decreases. For this reason, the voltage of the pixel electrode 118, which is a series connection point, becomes $$Vj - \{Cs/(Cs+Cpix)\} \cdot \Delta V$$

which is decreased from the voltage Vj of the data signal when the scanning signal Yi is at an H level by a value obtained by multiplying a voltage variation ΔV of the i-th capacitor line 132 by a ratio of the capacitance of the pixel capacitor 120 to the capacitance of the storage capacitor 130 {Cs/(Cs+Cpix)}. In other words, as the voltage Ci of the i-th capacitor line 132 is decreased by ΔV, the voltage of the pixel electrode 118 is decreased from the voltage Vj of the data signal when the scanning signal Yi is at an H level by {Cs/(Cs+Cpix)}·ΔV (this is defined as ΔVpix). Note that parasitic capacitances in the components are ignored.

Here, during the (n+1)th frame when the negative polarity writing is specified, the data signal Xj, when the scanning signal Yi is at an H level, is set to a voltage Vj by anticipating that the voltage of the pixel electrode 118 will decrease by a voltage ΔVpix. That is, the voltage of the pixel electrode 118, after it is decreased, is set lower than the voltage LCcom of the common electrode 108 and is set so that a differential voltage between the pixel electrode 118 and the common electrode 108 becomes a value corresponding to the gray-scale level of the i-th row and j-th column.

Figure 8A:
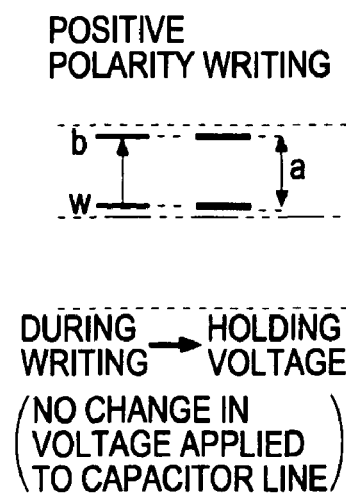
FIG. 8A and FIG. 8B are views showing a relationship between a data signal and a holding voltage in the electro-optical device.
Figure 8B:
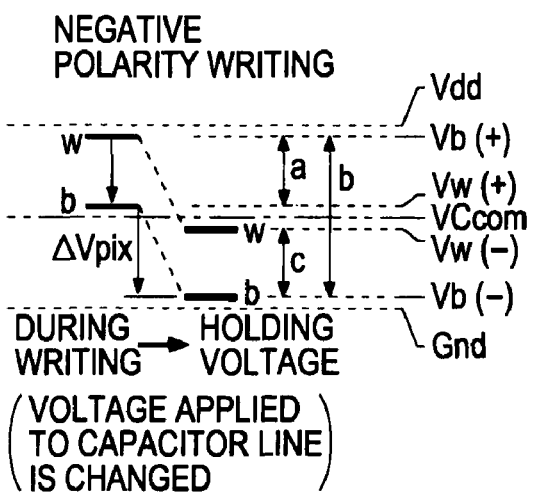

Specifically, in the present embodiment, as shown in FIG. 8, during the n-th frame when a positive polarity writing is performed, when a voltage of the data signal becomes higher from the voltage LCcom the lower (darker) the gray-scale level is in a range a from a voltage Vw(+) corresponding to a white color w to a voltage Vb(+) corresponding to a black color b, the data signal is, during the (n+1)th frame when a negative polarity writing is performed, set as the voltage Vb(+) when the pixel emits a white color w and set as the voltage Vw(+) when the pixel emits a black color b, so that the gray-scale levels are inverted during the (n+1)th frame but in the same voltage range a as in the case of the positive polarity voltage. Secondly, when the voltage of the pixel electrode 118 is decreased by a voltage ΔVpix after the voltage of the data signal has been written during the (n+1)th frame, the decrease in voltage ΔV of the capacitor line 132 is set so that the voltage of the pixel electrode 118 is made symmetrically to the positive polarity voltage using the reference voltage LCcom in a range c from a voltage Vw(−) corresponding to the white color of the negative polarity to a voltage Vb(−) corresponding to the black color of the negative polarity. In this manner, during the (n+1)th frame when the negative polarity writing is specified, the voltage of the pixel electrode 118, when decreased by a voltage ΔVpix, is shifted to a lower side than the voltage LCcom the lower (darker) the gray-scale level is in the negative polarity voltage range c corresponding to the gray-scale level.

Note that, though the pixel capacitor 120 and storage capacitor 130 of the i-th row and j-th column are described in FIG. 6, the similar operation may be performed over the i-th row in which the scanning line 112 and the capacitor line 132 are shared. In addition, during the (n+1)th frame, as in the case during the n-th frame, the scanning signals Y1, Y2, Y3, . . . , Y320, and Y321 sequentially attain an H level, so that the operation in each row is also sequentially performed for the pixels in each of the first, second, third, . . . , 320th rows.

Thus, in the present embodiment, the voltage range a of the data line during the (n+1)th frame when the negative polarity writing is specified is the same as that during the n-th frame when the positive polarity writing is specified. However, the voltage of the pixel electrode 118 after being shifted becomes a negative polarity voltage corresponding to the gray-scale level. In this manner, according to the present embodiment, elements that form the data line driving circuit 190 may have a low withstand voltage and voltage amplitudes in the data lines 114 that have parasitic capacitances may also become small, thus minimizing a loss of electric power used by those parasitic capacitances. That is, in the configuration in which the common electrode 108 is maintained at the voltage LCcom and the voltage of the capacitor line 132 is maintained constant over each frame, when the pixel capacitor 120 is driven by alternating current, and when a voltage ranging from the voltage Vw(+) to the voltage Vb(+) corresponding to the positive polarity is written into the pixel electrode 118 in correspondence with the gray-scale level during a certain frame, if there is no change in gray-scale level, a voltage that is inverted using the reference voltage LCcom and ranging from the voltage Vw(−) to the voltage Vb(−) corresponding to the negative polarity should be written into the pixel electrode 118 during the next frame. For this reason, in the configuration in which the voltage of the common electrode 108 is constant, when the voltage of the capacitor line 132 is constant, the voltage of the data signal also takes a value in the range b in the drawing, so that the withstand voltages of elements that form the data line driving circuit 190 also need to cover the range b. Further, as the voltage changes in the range b in the data line 114 that has parasitic capacitances, a loss of electric power increases due to the parasitic capacitances, but such an inconvenience is eliminated in the present embodiment.

Figure 7:
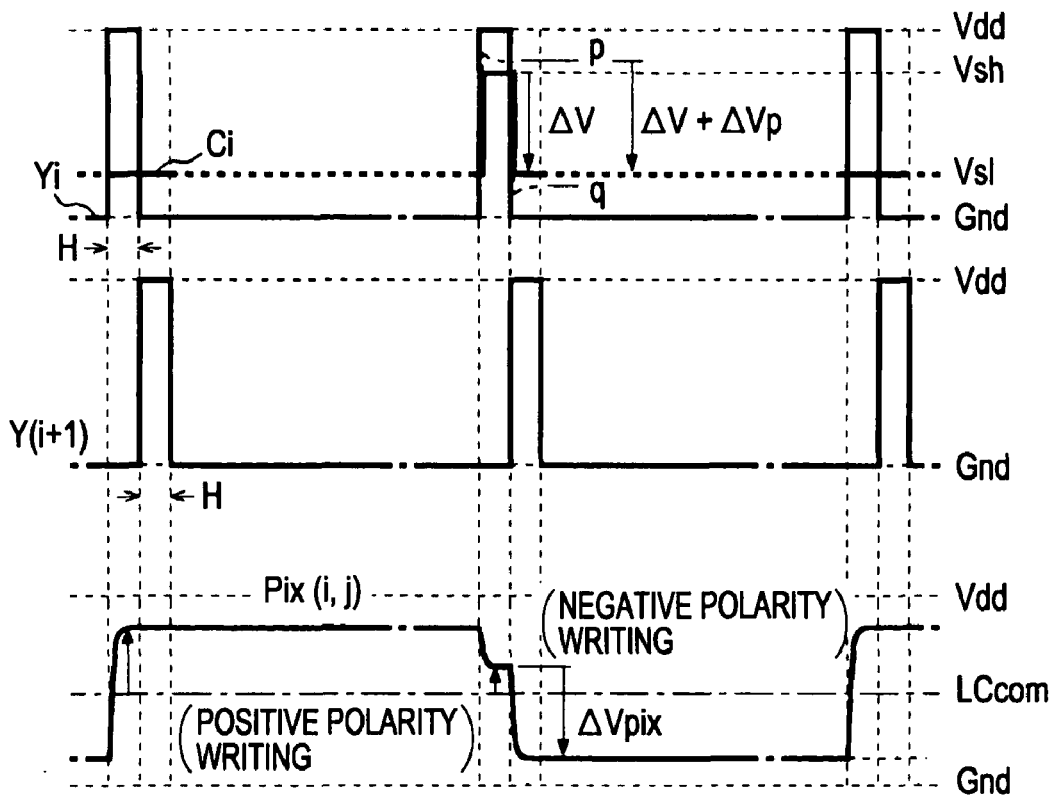
FIG. 7 is a voltage waveform diagram illustrating the operation of the electro-optical device.

Furthermore, according to the present embodiment as shown in FIG. 7, the voltage Ci of the i-th capacitor line 132, during a frame when the positive polarity is specified, becomes the voltage Vsl of the first power feed line 165 as the TFT 151 turns on when the scanning signal Yi attains an H level, and becomes the voltage Vsl of the second power feed line 167 as the TFT 152 turns on when the next scanning signal Y(i+1) attains an H level. Therefore, the voltage Ci of the i-th capacitor line 132, during a frame when the positive polarity writing is specified, does not change at the timing when the scanning signal Y(i+1) attains an H level. On the other hand, the voltage Ci of the i-th capacitor line 132, during a frame when the negative polarity writing is specified, becomes the voltage Vsh of the first power feed line 165 as the TFT 151 turns on when the scanning signal Yi attains an H level, and becomes the voltage Vsl of the second power feed line 167 as the TFT 152 turns on when the next scanning line Y(i+1) attains an H level. Therefore, the voltage Ci of the i-th capacitor line 132, during a frame when the negative polarity writing is specified, decreases by a voltage $\Delta V$ at the timing when the scanning signal Y(i+1) attains an H level. In the present embodiment, only two TFTs 151, 152 are sufficient to drive the capacitor line 132 of one row, and an additional control signal or control voltage is not required. Hence, it is possible to avoid a complex configuration of the capacitor line driving circuit 150 that drives the capacitor line 132 corresponding to each row. Note that FIG. 7 is a view showing a relationship in voltages among a scanning signal, a capacitor line and a pixel electrode, in which a variation in voltage of the i-th row and j-th column pixel electrode 118 is indicated by Pix(i, j).

Although the voltage range of the data signal when the positive polarity writing is specified is accordant with the voltage range of the data signal when the negative polarity writing is specified, it is possible to suppress voltage amplitudes of data signals owing to changes in voltage of the capacitor line 132 even when they are not completely accordant with each other.

Then, as the scanning signal Yi attains an H level, the TFT 116 corresponding to the i-th row turns on, so that the pixel capacitors 120 and the storage capacitors 130 are charged with voltages corresponding the data signals. At this time, charging current to the storage capacitors 130 flows to the on state TFT 151 through the i-th capacitor line 132. Here, when the on resistance of the TFT 151 is high, a noise may possibly be generated in the i-th capacitor line 132. On the other hand, since the capacitor line 132 intersects with the first through 240th data lines 114 through the gate insulation film and the protection layer, changes in voltages, that is, the data signals X1 through X240, of these data lines 114 are transmitted through parasitic capacitors to the capacitor line 132, thus generating a noise. In this manner, a noise is generated in each capacitor line 132 mainly due to two factors. Note that, of these two factors, it is not necessary appropriate to determine which one is more dominant, because it depends upon various conditions such as a configuration of panel or a driving method; therefore, at any rate a noise will be generated in each capacitor line 132.

Here, during the (n+1)th frame when the negative polarity writing is specified, when a noise is generated and a voltage applied to the i-th capacitor line 132 deviates from the voltage Vsh or the voltage Vsl at the end of the horizontal scanning period (H), that is, at the end of a period during which any one of the scanning lines 112 is selected, the voltage does not properly change by a voltage $\Delta V$ from a period during which the scanning signal Yi is at an H level to a period during which the scanning signal Y(i+1) is at an H level. For example, as shown in FIG. 7, when the voltage Ci of the i-th capacitor line 132 deviates from the voltage Vsh to a voltage p at the end of the period during which the scanning signal Yi is at an H level, the voltage changes not by a voltage $\Delta V$ but by a voltage ($\Delta V+\Delta Vp$) from the period during which the scanning signal Yi is at an H level to the period during which the scanning signal Y(i+1) is at an H level. Note that in the drawing, the voltage $\Delta Vp$ is a variation in voltage due to a deviation from the voltage Vsh to the voltage p.

Here, in consideration of the i-th row and j-th column pixel, when the voltage of the data signal Xj becomes the voltage Vj during a period when the scanning signal Yi is at an H level, and when the voltage of the i-th capacitor line 132 decreases by a voltage ($\Delta V+\Delta Vp$) toward a period during which the scanning signal Y(i+1) is at an H level, the voltage of the pixel electrode 118 becomes as follows.

$$Vj-\{Cs/(Cs+Cpix)\}\cdot(\Delta V+\Delta Vp)$$

Therefore, as compared to the original voltage, it decreases excessively by $\{Cs/(Cs+Cpix)\}\cdot\Delta Vp$ to perform a gray-scale level corresponding to this voltage. This phenomenon not only arises at the i-th row and j-th column but also arises at the i-th row pixels corresponding to the i-th capacitor line 132 in the same manner, so that a display chrominance non-uniformity in the horizontal direction may be recognized. Note that the voltage $\Delta Vp$ depends upon a variation in voltage of the data signals X1 through X240 during a period when the i-th row scanning line 112 is selected, that is, display contents performed by the pixels of the i-th row and first column to the i-th row and 240th column. Hence, the voltages of the pixel electrodes change depending on display contents and, as a result, a display chrominance non-uniformity in the horizontal direction arises. Here, though the description is given when the voltage Ci deviates from the voltage Vsh to the voltage p at the end of the period during which the scanning signal Yi is at an H level, the same problem arises if a deviation is made from the voltage Vsl to a voltage q at the end of the period during which the scanning signal Y(i+1) is at an H level, even when it is not deviated from the voltage Vsh.

In the present embodiment, during a period when the scanning signal Yi is at an H level, the TFT 176 is turned on to connect the i-th capacitor line 132 to the first detection line 185. In this manner, because the first capacitive signal output circuit 31 outputs the first capacitive signal Vc1 to the first power feed line 165 so that a voltage of the capacitor line 132 detected through the first detection line 185 becomes the voltage of the first target signal Vc1ref, the i-th capacitor line 132 is held at the voltage Vsh during a period when the scanning signal Yi is at an H level in the (n+1)th frame. Furthermore, during the next horizontal scanning period (H), that is, during a period when the scanning signal Y(i+1) is at an H level, the TFT 178 is turned on to connect the i-th capacitor line 132 to the second detection line 187. In this manner, because the second capacitive signal output circuit 32 outputs the second capacitive signal Vc2 to the second power feed line 167 so that a voltage of the capacitor line 132 detected through the second detection line 187 becomes the second target signal Vc2ref, the i-th capacitor line 132 is held at the voltage Vsl during a period when the scanning signal Y(i+1) is at an H level during the (n+1)th frame. Thus, the voltage of the i-th capacitor line 132 properly changes by a voltage $\Delta V$ from a period during which the scanning signal Yi is at an H level to a period during which the scanning signal Y(i+1) is at an H level. Though the i-th row is exemplarily described herein, the same applies to all the capacitor lines 132 in the first to 240th rows. Thus, in the present embodiment, it is possible to suppress a chrominance non-uniformity in the horizontal direction.

Note that when the on resistance of the TFT 151 is reduced, a noise to be generated in the capacitor line 132 may also be reduced, but, for this purpose, the size of the transistor of the TFT 151 needs to be increased. When the transistor size of the TFT 151 is increased, an additional area is required on the outer side of the display area 100 in the configuration in which elements are integrated with an element substrate. However, this outer area does not contribute to image display and becomes a dead space in light of a display device. Hence, this reduces a yield from one motherboard, thus eventually leading to increasing costs.

On the other hand, during the (n+1)th frame when the negative polarity writing is specified, the beginning of the horizontal scanning period (H) is the time immediately after the voltages of the data signals X1 through X240 are changed (that is, immediately after the TFT 151 turns on), it is presumable that a noise is relatively large. For this reason, if the first capacitive signal output circuit 31 employs a configuration for executing a negative feedback control from the beginning of the horizontal scanning period (H), it tends to cancel a noise, causing an electrical power consumption of the operational amplifier 300 to be large. In order to avoid erroneous operation against the relatively large noise, the scale of the circuit of the operational amplifier 300 and/or self-electrical power consumption may possibly be increased. Then, the first capacitive signal output circuit 31 according to the present embodiment, during the first half period of the horizontal scanning period (H), outputs the first capacitive signal Vc1, which the first target signal Vc1ref has merely buffered, by turning on the switch 311 and turning off the switch 312 (therefore, a generation of noise cannot be suppressed during the first half period). However, the first capacitive signal output circuit 31 is configured, during the second half period of the horizontal scanning period (H), to output the first capacitive signal Vc1 through a negative feedback control by turning off the switch 311 and turning on the switch 312 so that the voltage of the first detection line 185 becomes the voltage of the first target signal Vc1ref. Thus, during this second half period, a generation of noise may be suppressed. The second capacitive signal output circuit 32 has the same configuration as described above. That is, during the (n+1)th frame when the negative polarity writing is specified, when a target voltage is attained by reducing the voltage until the end of the horizontal scanning period (H) even when a noise is generated, the voltage changes by a voltage ΔV from a period during which the scanning signal Yi attains an H level to a period during which the scanning signal Y(i+1) attains an H level. Thus, in the present embodiment, a configuration is employed in which a generation of noise is allowed during the first half period of the horizontal scanning period and an influence of noise is suppressed during the second half period of the horizontal scanning period. In this manner, in the present embodiment, it is possible to balance suppression of an increase in scale of the circuit of the first capacitive signal output circuit 31 and second capacitive signal output circuit 32 and reduction in electrical power consumption in these circuits. Note that, for example, because the scale of the electro-optical device is reduced, the negative feedback control of the operational amplifier 300 may be executed if the capacitance Cs of the storage capacitor 130 is small. In this configuration, it is not only unnecessary to generate the period specifying signal Ha but also unnecessary to include the switches 311, 312 and the NOT circuit 315, so that the configuration of the circuit may be simplified by that much.

Note that, in the present embodiment, the i-th capacitor line 132 is configured so that the voltage Ci, during a period when the scanning signal Yi attains an H level, is set to a voltage of the first target signal Vc1ref and also the voltage Ci, during a period when the next scanning signal Y(i+1) attains an H level, is set to a voltage of the second target signal Vc2ref. However, the importance of these operations is different, and one that comes later, operated by the second capacitive signal output circuit 32, may be omitted because it is presumable that a reduction in noise may be proceeding. When the second capacitive signal output circuit 32 is omitted, it is only necessary to output the second target signal Vc2ref as the second capacitive signal Vc2.

Figure 9:
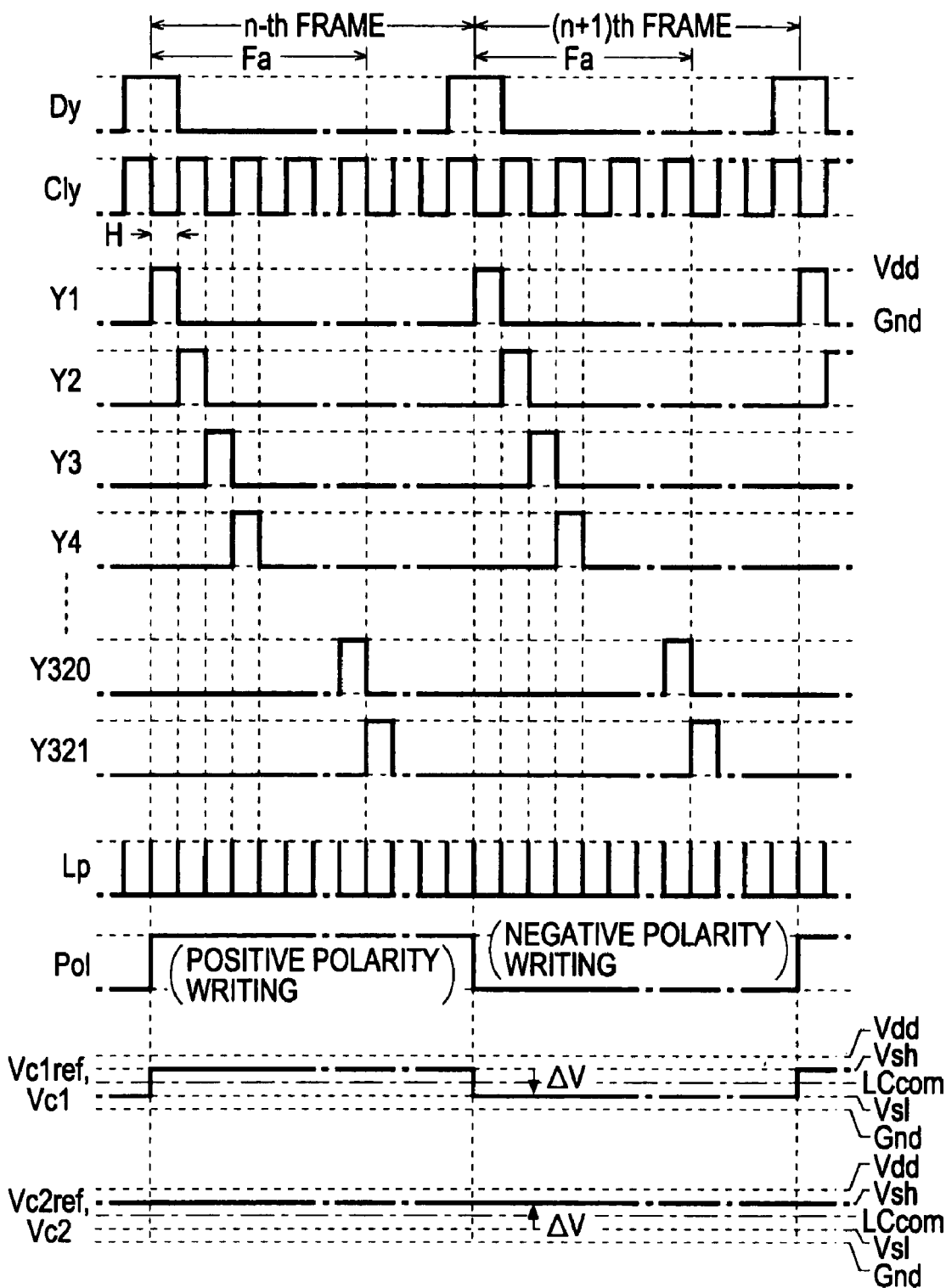
FIG. 9 is a view illustrating a first alternative operation of the electro-optical device.

In addition, in the first embodiment, by maintaining the second capacitive signal Vc2 constant at the voltage Vsl, the voltage of the i-th capacitor line 132 is not changed when the scanning signal Y(i+1) attains an H level during the n-th frame when the positive polarity writing is specified, while the voltage of the i-th capacitor line 132 is reduced by a voltage ΔV to reduce the voltage of the pixel electrode 118, which has been written when the scanning signal Yi is at an H level, by a voltage ΔVpix when the scanning signal Y(i+1) attains an H level during the (n+1)th frame when the negative polarity writing is specified. However, the operation may be opposite to it. That is, as shown in FIG. 9, a configuration is applicable, in which, by maintaining a second capacitive signal constant at the voltage Vsh, the voltage of the i-th capacitor line 132 is not changed when the scanning signal Y(i+1) attains an H level during a frame when the negative polarity writing is specified, while the voltage of the i-th capacitor line 132 is increased by a voltage ΔV to increase the voltage of the pixel electrode 118, which has been written when the scanning signal Yi is at an H level, by a voltage ΔVpix when the scanning signal Y(i+1) attains an H level during a frame when the positive polarity writing is specified. In this configuration, a voltage relationship of data signals may be obtained by inverting the waveforms, and the like, shown in FIG. 8A and FIG. 8B with respect to the reference voltage LCcom and by reading the positive polarity writing as a negative polarity writing and reading the negative polarity writing as a positive polarity writing.

Figure 10:
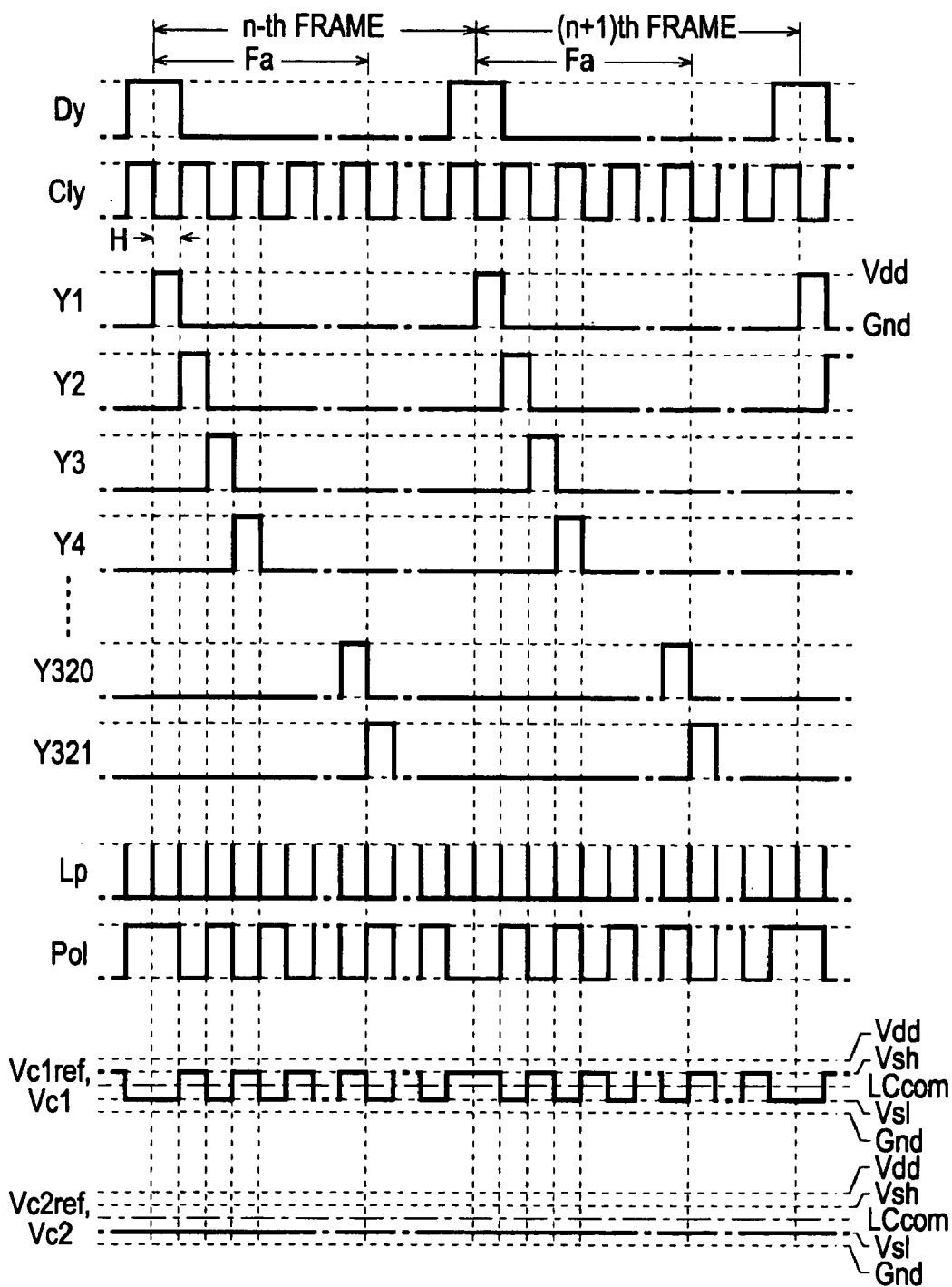
FIG. 10 is a view illustrating a second alternative operation of the electro-optical device.

Although, in the description, a surface inversion drive method in which a polarity written into a pixel is set the same during a single frame and the writing polarity is inverted every frame is employed, a scanning line (line) inversion drive method in which a writing polarity is inverted every row may be employed. When the scanning line inversion drive method is employed, the polarity specifying signal Pol, as shown in FIG. 10, is inverted every horizontal scanning period (H), and the polarities during any adjacent frames are inverted to each other during a period when the same scanning signal attains an H level (the same scanning line is selected). Further, the voltage of the first capacitive signal Vc1 becomes the voltage Vsl when the polarity specifying signal Pol is at an H level and becomes the voltage Vsh when the polarity specifying signal Pol is at an L level. In this manner, during the n-th frame in FIG. 10, the capacitor lines 132 in the odd numbered (1, 3, 5, . . . , 319) rows do not change in voltage when the scanning signals supplied to the next corresponding scanning lines 112 in the even numbered (2, 4, 6, . . . , 320) rows attain H levels, but the capacitor line 132 in the even numbered rows decrease in voltage by ΔV when the scanning signals supplied to the next corresponding scanning lines 112 in the odd numbered rows attain H levels. Thus, during the n-th frame in FIG. 10, the positive polarity writing is executed for the odd numbered rows as in the case shown in FIG. 8A, while the negative polarity writing is executed for the even numbered rows as in the case shown in FIG. 8B. On the other hand, during the (n+1)th frame in FIG. 10, the capacitor lines 132 in the odd numbered rows decrease in voltage by ΔV when the scanning signals supplied to the next corresponding scanning lines 112 attain H levels, but the capacitor lines 132 in the even numbered rows do not change in voltage when the scanning signals supplied to the next corresponding scanning lines 112 in the odd numbered rows attain H levels. Thus, during the (n+1)th frame in FIG. 10, the negative polarity writing is executed in the odd numbered rows as in the case shown in FIG. 8B, while the positive polarity writing is executed in the even numbered rows as in the case shown in FIG. 8A. Note that, although, in FIG. 10, the voltage of the second capacitive signal Vc2 is set to the voltage Vsl, it is applicable that the voltage of the second capacitive signal Vc2 is set to the voltage Vsh to increase the voltage of the capacitor line 132 by ΔV.

Figure 11:
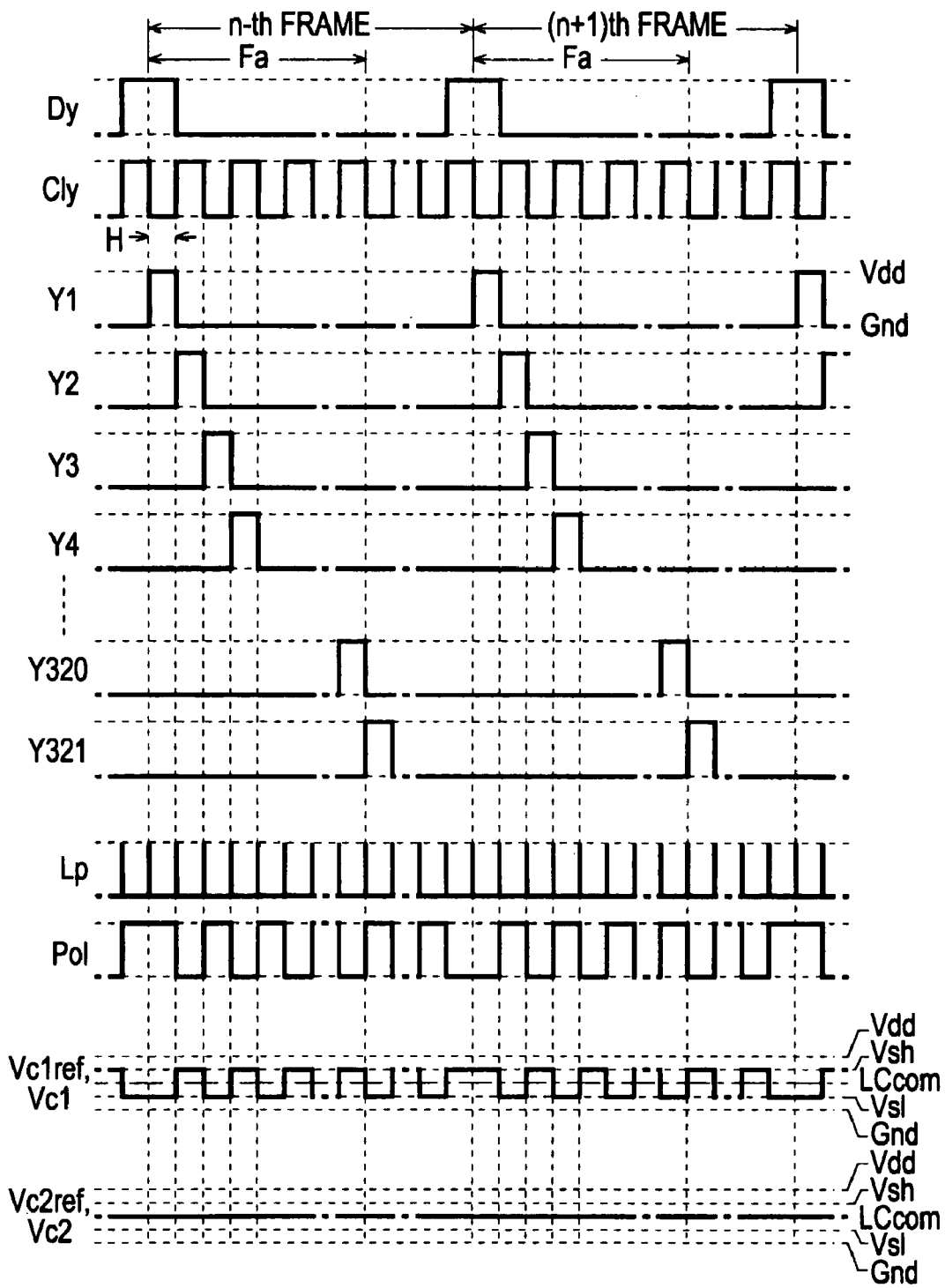
FIG. 11 is a view illustrating a third alternative operation of the electro-optical device.

In addition, when such a scanning line inversion drive method is employed, the second capacitive signal Vc2 may be maintained constant at the voltage LCcom, as shown in FIG. 11. When the second capacitive signal Vc2 is maintained constant at the voltage LCcom, during the n-th frame in FIG. 11, the voltages of the capacitor lines 132 in the odd numbered rows increase from the voltage Vsl to the voltage LCcom when the scanning signals supplied to the next corresponding scanning lines 112 in the even numbered rows attain H levels, and the voltages of the capacitor lines 132 in the even numbered rows decrease from the voltage Vsh to the voltage LCcom when the scanning signals supplied to the next corresponding scanning lines 112 in the odd numbered rows attain H levels, while, on the other hand, during the (n+1)th frame, the voltages of the capacitor lines 132 in the odd numbered rows decrease from the voltage Vsh to the voltage LCcom when the scanning signals supplied to the next corresponding scanning lines 112 in the even numbered rows attain H levels, and the voltages of the capacitor lines 132 in the even numbered rows increase from the voltage Vsl to the voltage LCcom when the scanning signals supplied to the next corresponding scanning lines 112 in the odd numbered rows attain H levels. Here, when the amount of increase in voltage from the voltage Vsl to the voltage LCcom and the amount of variation in voltage from the voltage LCcom to the voltage Vsl are set equal to ΔV, as shown in FIG. 12, in the i-th row pixel electrode, it is alternately executed every one frame for the positive polarity writing and for the negative polarity writing to shift a voltage, which is written when the scanning signal Yi attains an H level, by the voltage ΔVpix by changing the voltage of the i-th capacitor line 132 by a voltage ΔV when the scanning signal Y(i+1) attains an H level.

Here, for data signals, if the voltage range when the negative polarity writing is specified is accordant with a voltage range a when the positive polarity writing is specified, the same advantageous effect as shown in FIG. 1 is obtained. That is, as shown in FIG. 13, it is only necessary, during the n-th frame when the positive polarity writing is performed, to set the middle of the voltage range a so as to coincide with the voltage LCcom, and to set the voltage ΔV(=Vsh−LCcom=LCcom−Vsl) so as to be shifted to a range from the voltage Vw(+) to the voltage Vb(+) when the voltage is increased by a voltage ΔVpix, and so as to be shifted to a range from the voltage Vw(−) to the voltage Vb(−) when the voltage is decreased by a voltage ΔVpix. However, as regards the voltage range a shown in FIG. 13, the low level corresponds to a white color w side and the high level corresponds to a black color b side when the positive polarity writing is specified, while the high level corresponds to a white color w side and the low level corresponds to a black color b side when the negative polarity writing is specified. Thus, the relationship of the gray-scale level is inverted. Note that, even when the voltage range of a data signal when the positive polarity writing is specified is not made accordant with the voltage range of a data signal when the negative polarity writing is specified, it is still possible to suppress the voltage amplitude of a data signal by means of varying a voltage applied to the capacitor line 132.

Figure 14:
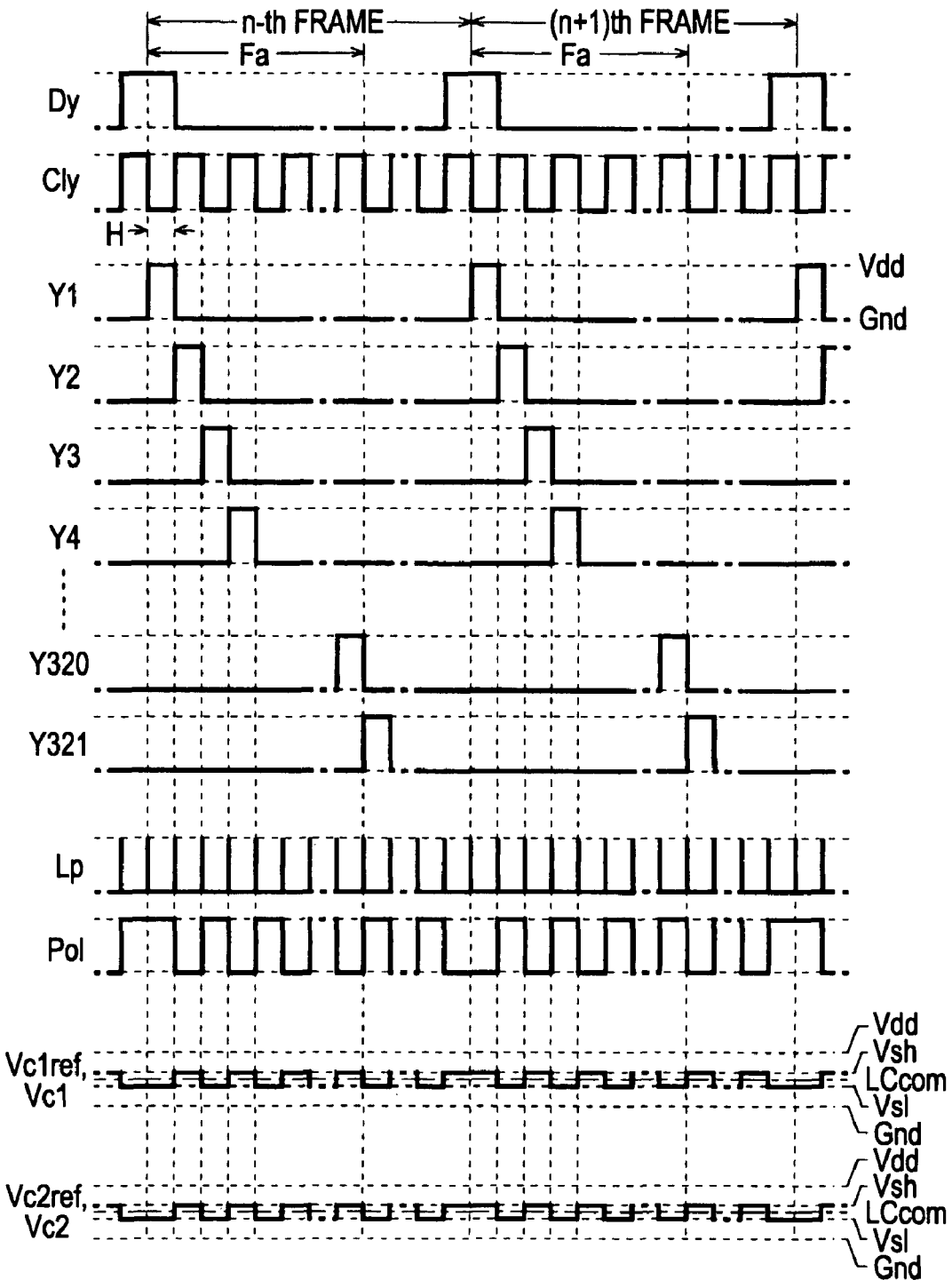
FIG. 14 is a view illustrating a further fourth alternative operation of the electro-optical device.

Incidentally, as shown in FIG. 3, because the first power feed line 165 and the second power feed line 167 each intersect with the scanning lines 112 (with being electrically insulated), parasitic capacitances are generated. Thus, as the electric potentials of the first power feed line 165 and second power feed line 167 change, an electric power is unnecessarily consumed due to these parasitic capacitances. In general, where a parasitic capacitance is C, a change in voltage is V, and a frequency of change (frequency) is f, electrical power consumption may be expressed by $CV^2 f$. Then, as shown in FIG. 14, the voltage waveform of the second capacitive signal Vc2 is set the same as that of the first capacitive signal Vc1, and the voltage amplitude is set a half of the first capacitive signal Vc1 shown in FIG. 4. As a result, as in the case of FIG. 10 (FIG. 11), the scanning line inversion drive method in which the positive polarity writing and the negative polarity writing are alternately executed every scanning line. Here, each electrical power consumption due to the parasitic capacitances of the first power feed line 165 and second power feed line 167 is as follows.

$$C(V/2)^2 f$$

However, because both the first power feed line 165 and the second power feed line 167 change in voltage, the parasitic capacitances eventually become as follows.

$$2C(V/2)^2 f = (1/2)CV^2 f$$

Thus, in comparison with the case shown in FIG. 10, it is possible to decrease by half the electrical power consumed by the first power feed line 165 and the second power feed line 167. Note that, when the first capacitive signal Vc1 and the second capacitive signal Vc2 are changed as shown in FIG. 14, it is only necessary to specify a voltage range, for example, as shown in FIG. 13, for the voltage of a data signal.

Figure 15:
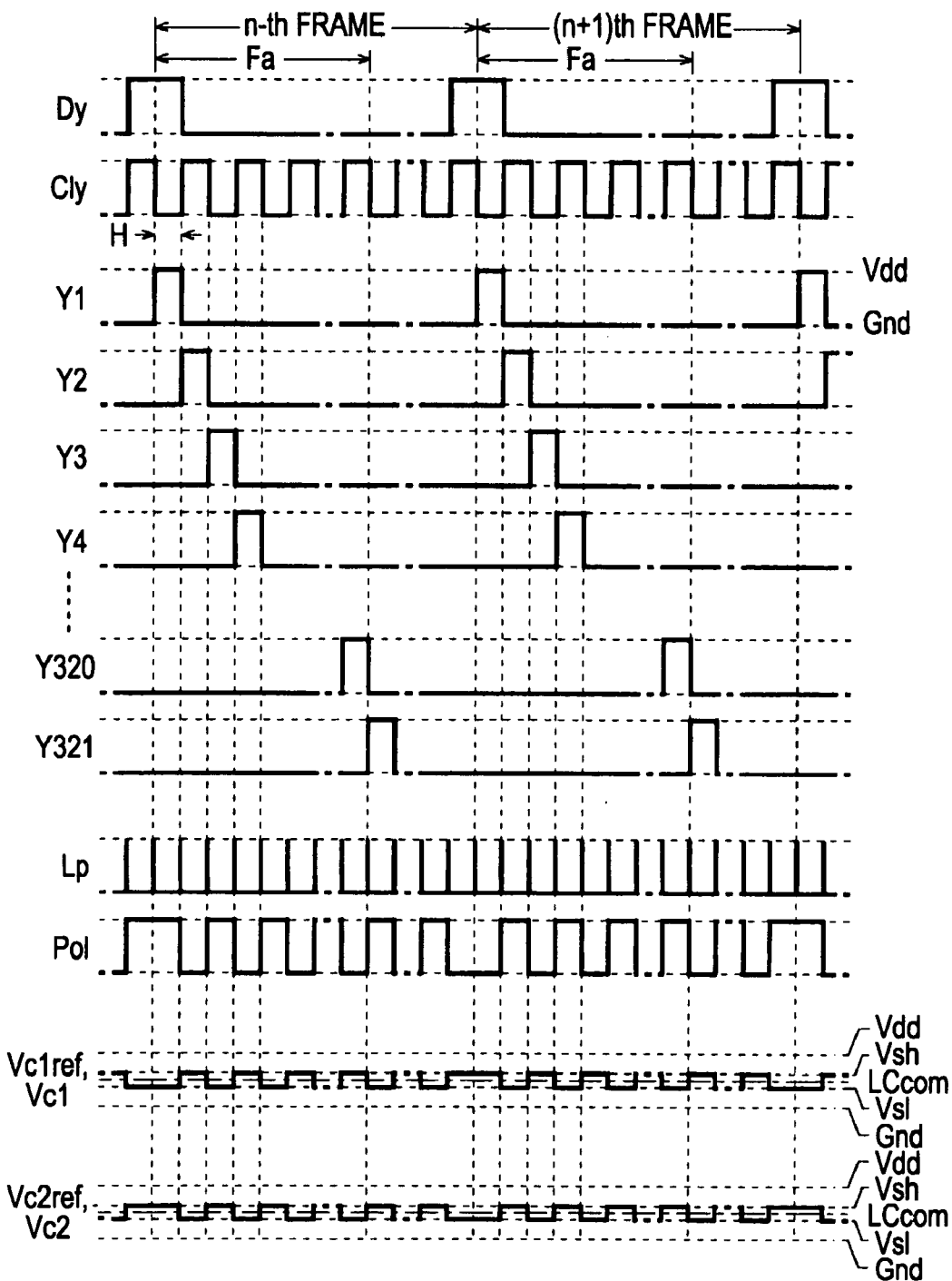
FIG. 15 is a view illustrating a further fifth alternative operation of the electro-optical device.

On the other hand, as shown in FIG. 3, the capacitor lines 132 each intersect with the second power feed line 167 (with being electrically insulated therebetween), but the capacitor lines 132 do not intersect with the first power feed line 165. However, when a configuration, other than the configuration shown in FIG. 3, is employed (for example, when a configuration in which the capacitor lines 132 not only intersect with the second power feed line 167 but also intersect with the first power feed line 165 is employed), the capacitor lines 132 are electrically connected to both the first power feed line 165 and the second power feed line 167 through the respective parasitic capacitors. In particular, in the present embodiment, when the scanning signals Yi, Y(i+1) both are in L levels, the i-th capacitor line 132 enters a high impedance state. Thus, when the first power feed line 165 and the second power feed line 167 change in voltage, the voltage change is transmitted through the parasitic capacitors to the capacitor line 132 and then may possibly cause the electric potential in a high impedance state to fluctuate. As the electric potential of the i-th capacitor line 132 fluctuates when the scanning signals Yi, Y(i+1) both are in L levels, electric charge stored in the pixel capacitors 120 may be moved to deviate from the voltage corresponding to the gray-scale level, so that such voltage fluctuation needs to be suppressed as much as possible. Then, though not specifically shown in the drawing, it is applicable that, in a state where the gate electrode of the i-th row TFT 151 is not connected to the (i+1)th row scanning line 112 but to the (i+2)th row scanning line 112 located on the lower side from the (i+1)th row scanning line 112, as shown in FIG. 15, when the voltage of the first capacitive signal Vc1 is set to the voltage Vsl when the polarity specifying signal Pol is at an H level and is set to the voltage Vsh when the polarity specifying signal Pol is at an L level, the voltage of the second capacitive signal Vc2 is set to the other voltage as compared to the voltages Vsl, Vsh used as the first capacitive signal Vc1. Note that, when the first capacitive signal Vc1 and the second capacitive signal Vc2 are changed as shown in FIG. 15, it is only necessary to specify a voltage range for the voltage of the data signal, for example, as shown in FIG. 13.

Thus, if it is configured in such a complementary manner that the voltage of the second capacitive signal Vc2 is the voltage Vsh when the voltage of the first capacitive signal Vc1 is the voltage Vsl, while the voltage of the second capacitive signal Vc2 is the voltage Vsl when the voltage of the first capacitive signal Vc1 is the voltage Vsh, when the first capacitive signal Vc1 changes in voltage, the second capacitive signal Vc2 changes in voltage inversely by the same amount. For this reason, if the parasitic capacitance formed between the capacitor lines 132 and the first power feed line 165 is equal to the parasitic capacitance formed between the capacitor lines 132 and the second power feed line 167, the influence of the change in voltage of the first power feed line 165 on the capacitor lines 132 is cancelled by the influence of the change in voltage of the second power feed line 167 on the capacitor lines 132, so that it is possible to suppress fluctuation in electric potential of the capacitor lines 132 in a high impedance state.

Note that, in the case shown in FIG. 15, the voltage $\Delta V$ of the i-th capacitor line 132 is determined by the relative change in voltage between the first capacitive signal Vc1 and the second capacitive signal Vc2. For this reason, in comparison with the configuration in which the voltage of the first capacitive signal Vc1 is changed while the voltage of the second capacitive signal Vc2 is constant (FIG. 5, FIG. 9, FIG. 10, FIG. 11), the voltage amplitude of the capacitor signal becomes half (in terms of this point, the same applies to FIG. 14). Note that, if the parasitic capacitance formed between the capacitor lines 132 and the first power feed line 165 is different from the parasitic capacitance formed between the capacitor lines 132 and the second power feed line 167, it is only necessary to differentiate the voltage amplitude of the first capacitive signal Vc1 from the voltage amplitude of the second capacitive signal Vc2 in accordance with the amounts of these parasitic capacitances.

Second Embodiment

Figure 16:
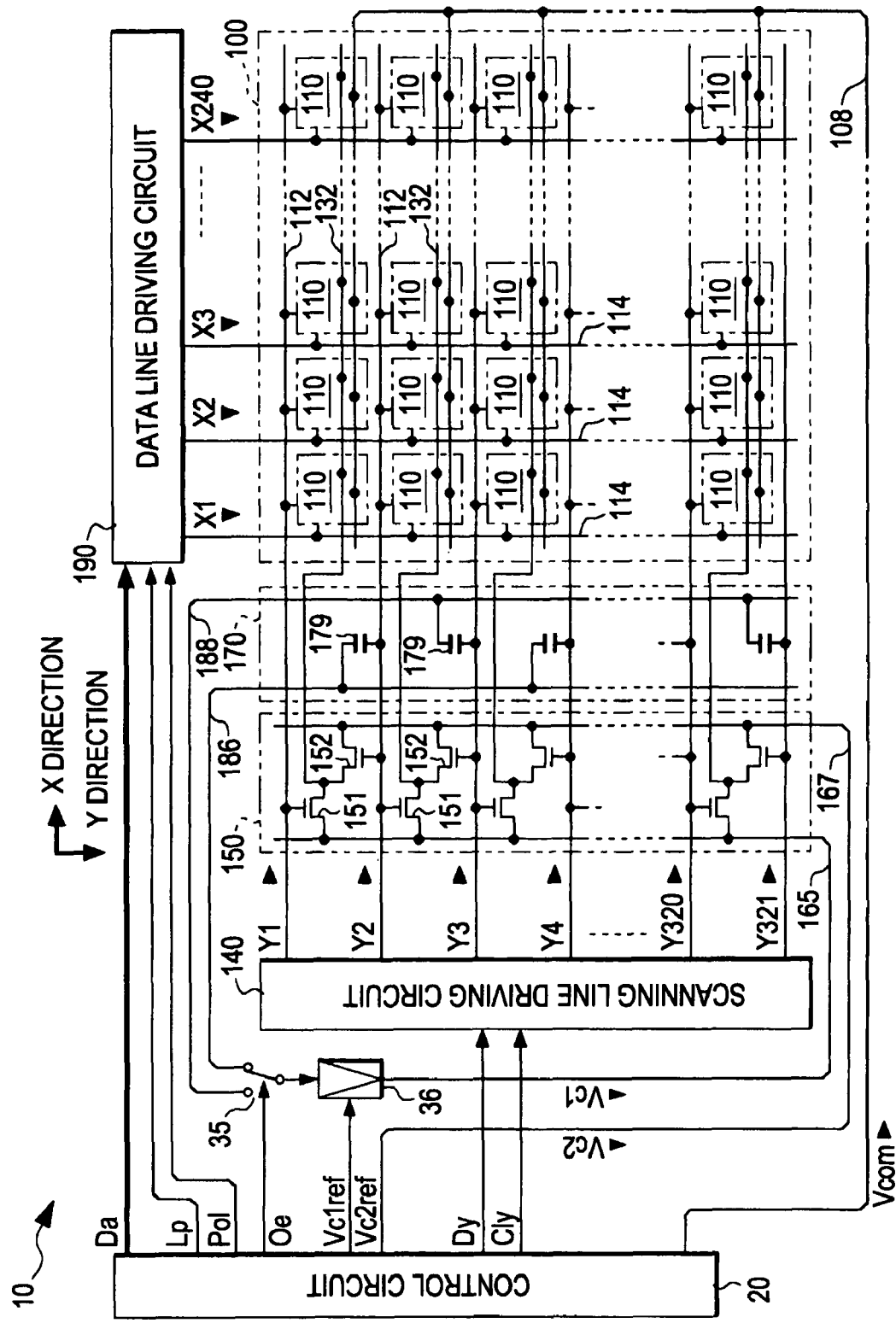
FIG. 16 is a view showing a configuration of an electro-optical device according to a second embodiment of the invention.

A second embodiment of the invention will now be described. FIG. 16 is a block diagram showing a configuration of an electro-optical device according to the second embodiment of the invention. The configuration shown in the drawing mainly differs from those of the first embodiment (see FIG. 1) in that capacitors 179 are provided in correspondence with the rows in the detection circuit 170. Specifically, one ends of the capacitors 179 corresponding to the odd numbered (1, 3, 5, . . . , 319) rows are connected to the capacitor lines 132 in the corresponding rows and the other ends thereof are connected to the first detection line 186, while one ends of the capacitors 179 corresponding to the even numbered (2, 4, 6, . . . , 320) rows are connected to the capacitor lines 132 in the corresponding rows and the other ends thereof are connected to the second detection line 188. The control circuit 20 outputs a row specifying signal Oe that attains an H level when the scanning lines 112 in the odd numbered rows are selected and that attains an L level when the scanning lines 112 in the even numbered rows are selected. A switch 35 selects the first detection line 186 when the row specifying signal Oe is at an H level as shown in the drawing, while the switch 35 selects the second detection line 188 when the row specifying signal Oe is at an L level. In the second embodiment, a first capacitive signal output circuit 36 adds an inversion signal against a noise, that appears in the first detection line 186 or second detection line 188 selected by the switch 35, to the first target signal Vc1ref and outputs the resultant signal as the first capacitive signal Vc1. Note that, in the second embodiment, the second capacitive signal output circuit 32 is omitted for the above described reason, so that the second target signal Vc2ref is output as the second capacitive signal Vc2.

Figure 17:
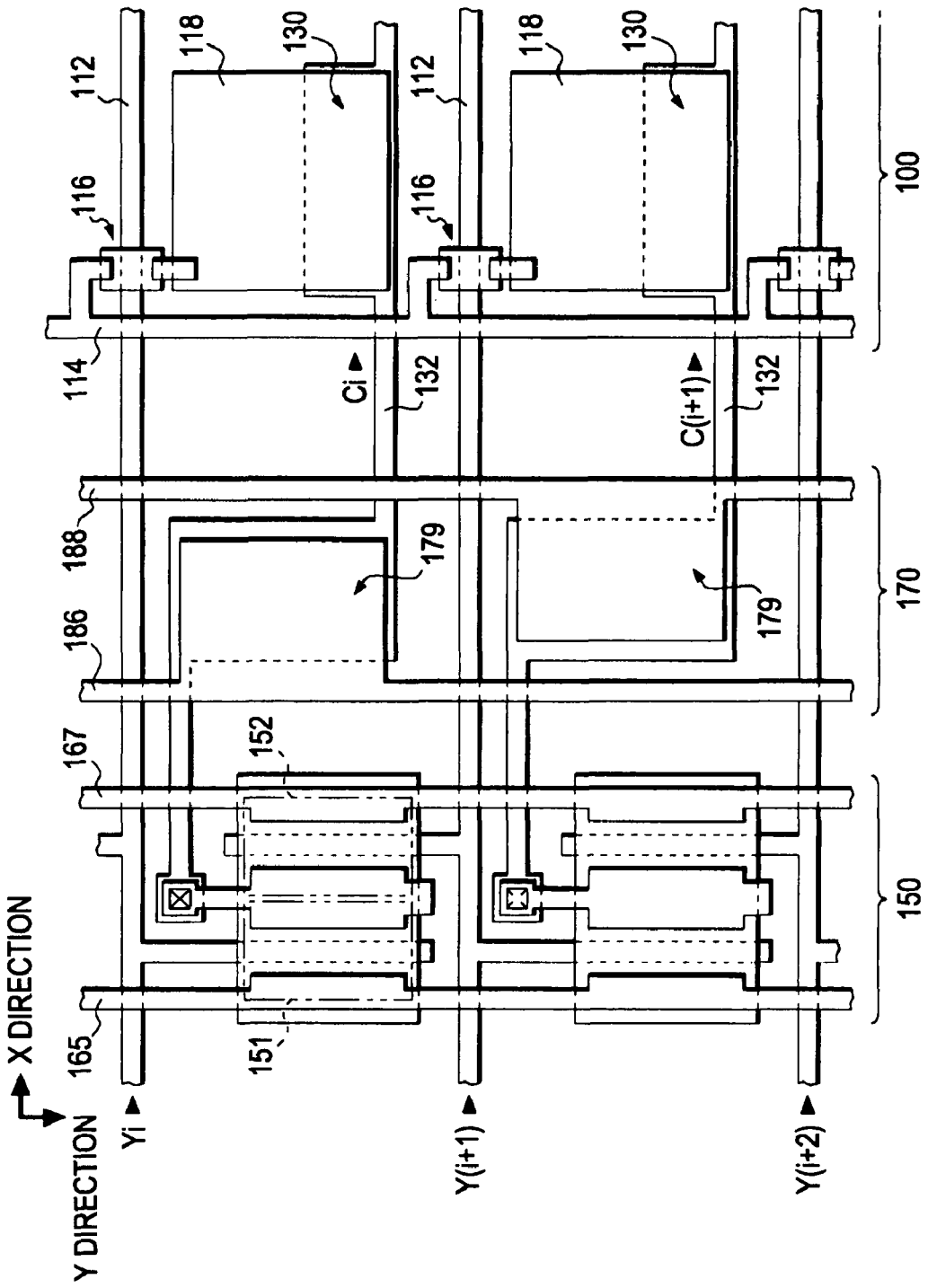
FIG. 17 is a view showing a peripheral configuration of a display area of the electro-optical device.

FIG. 17 is a plan view showing a configuration of the capacitor line driving circuit 150, the detection circuit 170 and the peripheral portions of the display area 100, of the element substrate, according to the second embodiment. As shown in the drawing, the capacitor line 132 is formed to have wide portions in the detection circuit 170, the first detection line 186 and the second detection line 188 are formed to overlap the above wide portions of the capacitor line 132 by patterning a metal layer that forms a third conductive layer. Thus, the capacitors 179 are configured to hold a gate insulation film as a dielectric between the capacitor line 132 and the first detection line 186 or between the capacitor line 132 and the second detection line 188.

According to the second embodiment, when a noise is generated in the capacitor line 132 corresponding to the selected scanning line during a horizontal scanning period (H) when one of the scanning lines 112 in the odd numbered rows is selected, the noise is transmitted to the first detection line 186 through the capacitor 179 corresponding to the capacitor line 132. The switch 35 selects the first detection line 186 during the horizontal scanning period (H) when one of the scanning lines 112 in the odd numbered rows is selected, so that the first capacitive signal output circuit 36 adds an inversion signal against the transmitted noise to the first target signal Vc1ref and then outputs the resultant signal as the first capacitive signal Vc1, hence the noise generated in the capacitor line 132 is canceled. On the other hand, when a noise is generated in the capacitor line 132 corresponding to the selected scanning line during a horizontal scanning period (H) when one of the scanning lines 112 in the even numbered rows is selected, the noise is transmitted to the second detection line 188 through the capacitor 179 corresponding to the capacitor line 132. The switch 35 selects the second detection line 188 during the horizontal scanning period (H) when one of the scanning lines 112 in the even numbered rows is selected, the first capacitive signal output circuit 36 adds an inversion signal against the transmitted noise to the first target signal Vc1ref and then outputs the resultant signal as the first capacitive signal Vc1, hence, the noise generated in the capacitor line 132 is canceled. In this manner, in the second embodiment as well, because a noise is canceled in the capacitor line 132 corresponding to the selected scanning line, it is possible to suppress chrominance non-uniformity in the horizontal direction.

Third Embodiment

In the above described first and second embodiments, the i-th capacitor line 132, when the scanning signal Y(i+1)

attains an L level after the end of selection of the (i+1)th row scanning line, enters a high impedance state and continues the high impedance state until the next scanning signal Yi attains an H level after the following one frame period elapses. The capacitor lines 132 intersect with (or are in proximity to) other wiring lines and combine with the other wiring lines through parasitic capacitances, so that fluctuation in voltage of these wiring lines tends to influence the capacitor lines 132 (except the example shown in FIG. 15). Then, a third embodiment in which stabilization of voltage is attempted without causing the capacitor lines 132 to enter into a high impedance state will be described.

Figure 18:
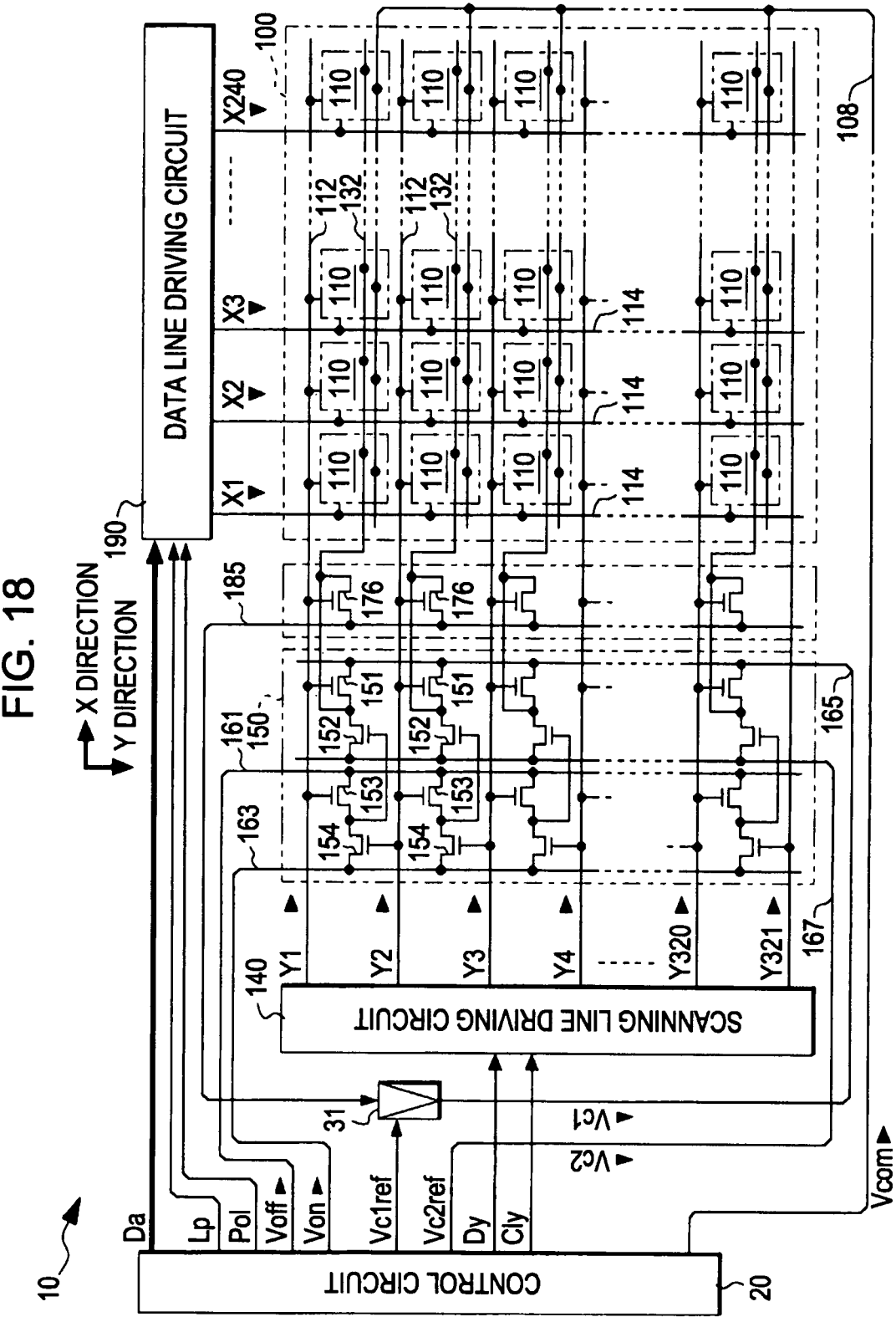
FIG. 18 is a view showing a configuration of an electro-optical device according to a third embodiment of the invention.

FIG. 18 is a block diagram showing a configuration of an electro-optical device according to the third embodiment of the invention. As shown in the drawing, in the third embodiment, the configurations of the capacitor line driving circuit 150 and detection circuit 170 differ from those of the first embodiment. Specifically, the capacitor line driving circuit 150 in the third embodiment includes, in addition to the set of n-channel TFTs 151, 152, a set of TFTs 153, 154 in correspondence with the capacitor lines 132 in the first through 320th rows. Here, the TFTs 151 to 154 corresponding to the i-th capacitor line 132 will be described. The gate electrode of the TFT 151 is connected to the i-th row scanning line 112 and the source electrode thereof is connected to the first power feed line 165. However, the gate electrode of the TFT 152 is commonly connected to the drain electrodes of the TFTs 153, 154. Note that the source electrode of the TFT 152 is connected to the second power feed line 167, and the drain electrodes of the TFTs 151, 152 each are commonly connected to the i-th capacitor line 132. The gate electrode of the i-th row TFT 153 (a third transistor) is connected to the i-th row scanning line 112 and the source electrode thereof is connected to an off voltage power feed line 161. Then, the gate electrode of the TFT 154 is connected to the (i+1)th row scanning line 112 and the source electrode thereof is connected to an on voltage power feed line 163. The off voltage power feed line 161 is supplied with a signal Voff. The voltage of the signal Voff is a voltage that causes the TFT 152 to be in an off state (non-conductive state between the source and the drain) even when the voltage of the signal Voff is applied to the gate electrode of the TFT 152. In addition, the on voltage power feed line 163 is supplied with a signal Von. The voltage of the signal Von is a voltage that causes the TFT 152 to be in an on state (conductive state between the source and the drain) when the voltage of the signal Von is applied to the TFT 152.

On the other hand, in the detection circuit 170 according to the third embodiment, the capacitor lines 132 in the first through 320th rows each only include the n-channel TFT 176 but each do not include the TFT 178. Therefore, only the first detection line 185 to which the drain electrodes of the TFTs 176 are connected is provided, but the second detection line 187 is not provided. Note that, in the third embodiment, because the second capacitive signal output circuit 32 is omitted, the second target signal Vc2ref is output as the second capacitive signal Vc2 as it is.

Figure 19:
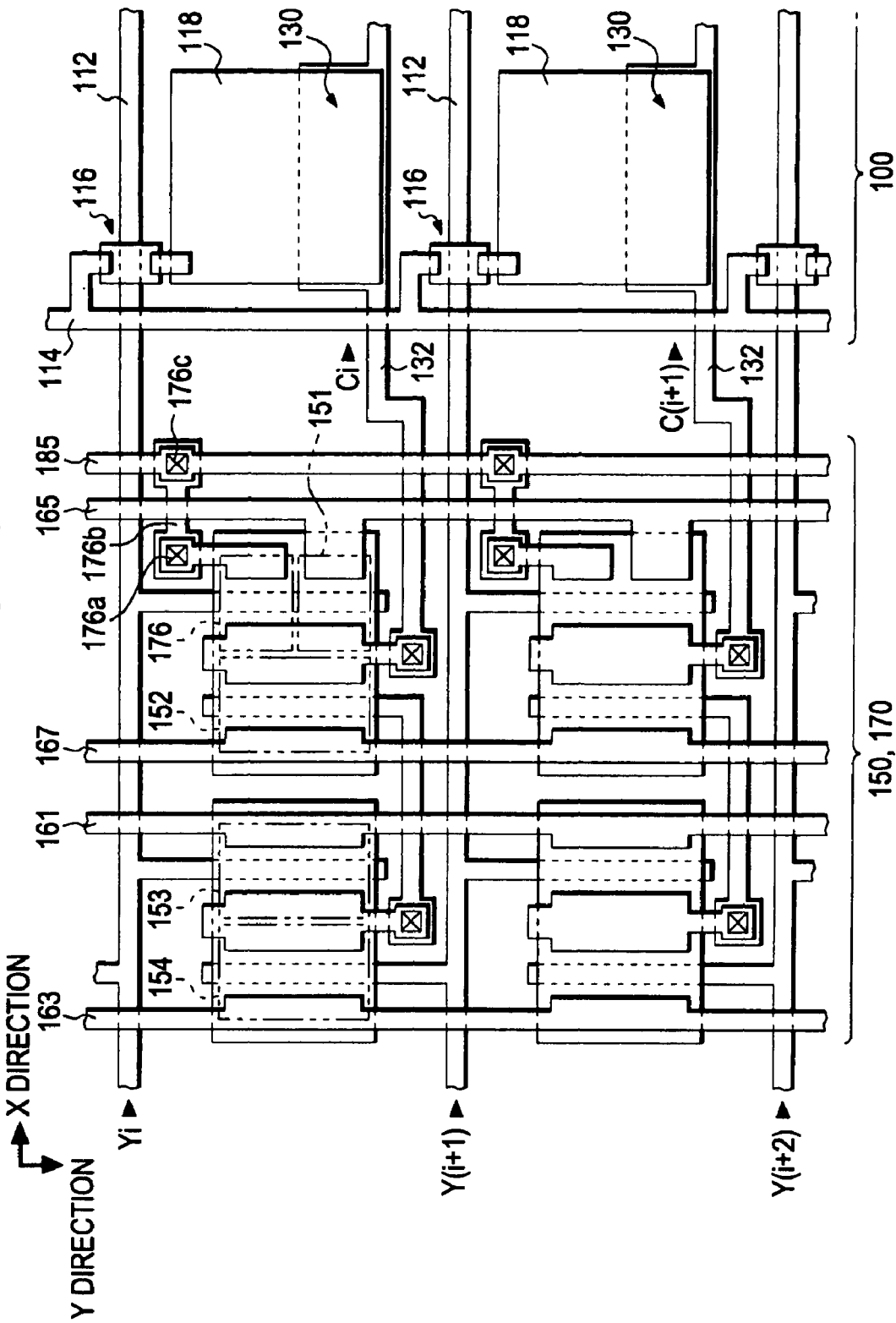
FIG. 19 is a view showing a peripheral configuration of a display area of the electro-optical device.

FIG. 19 is a plan view showing a configuration of the capacitor line driving circuit 150, the detection circuit 170 and the peripheral portions of the display area 100, of the element substrate, according to the third embodiment. As shown in the drawing, the gate electrode of the i-th row TFT 153 is a portion that is branched from the i-th row scanning line 112 in the Y (downward) direction to form a T-shape, and the gate electrode of the TFT 154 corresponding to the same i-th row is a portion that is branched from the (i+1)th row scanning line 112 in the Y (upward) direction to form a T-shape. The common drain electrode of the TFTs 153, 154 is connected to the gate electrode of the TFT 152 through a contact hole. In addition, the drain electrode of the i-th row TFT 176 is connected through a contact hole 176a to a wiring line 176b which is formed by patterning a gate electrode layer, and the wiring line 176b is then connected through a contact hole 176c to the first detection line 185.

According to the third embodiment, as the scanning signal Yi attains an H level, the i-th row TFT 153 is turned on over the horizontal scanning period (H). For this reason, the i-th row TFT 152 is turned off because the signal Voff of the off voltage power feed line 161 is applied to the gate electrode thereof. In addition, because the i-th row TFTs 151, 176 turn on, the i-th capacitor line 132 is connected to the first detection line 185 together with the first power feed line 165, so that the voltage applied to the i-th capacitor line 132 is controlled by the first capacitive signal output circuit 31 so as to become the voltage of the first target signal Vc1ref. Next, when the scanning signal Yi attains an L level and the scanning signal Y(i+1) attains an H level, the i-th row TFT 153 turns off and the i-th row TFT 154 turns on over the horizontal scanning period (H). For this reason, because the signal Von of the on voltage power feed line 163 is applied to the gate electrode of the TFT 152, the i-th row TFT 152 turns on. Therefore, the voltage applied to the i-th capacitor line 132 becomes a voltage of the second target signal Vc2ref of the second power feed line 167. Subsequently, when the scanning signal Y(i+1) attains an L level and the scanning signal Y(i+2) attains an H level, the i-th row TFT turns off, so that the gate electrode of the TFT 152 enters a high impedance state, but, owing to the parasitic capacitance, the gate electrode is held at a voltage of the signal Von that the gate electrode have had just before then. Therefore, because the TFT 152 continues to maintain an on state, the i-th capacitor line 132 maintains a voltage of the second target signal Vc2ref of the second power feed line 167. That is, the i-th capacitor line 132 maintains a voltage of the second capacitive signal Vc2 even when the i-th row scanning line 112 is not selected. Here, a non-selected period is much longer than a selected period, so that, even when a noise is generated, the influence of the noise is vanishingly reduced. For this reason, in the third embodiment, the second capacitive signal output circuit 32 that outputs the second capacitive signal Vc2 so that a voltage detected at the second detection line becomes a voltage of the second target signal Vc2ref is unnecessary. Note that, in the third embodiment, the first target signal Vc1ref and the second target signal Vc2ref may employ the waveforms shown in FIG. 5, FIG. 9, FIG. 10, and FIG. 11. That is, the second target signal Vc2ref may employ a waveform that does not change in voltage.

In the above described embodiments, in the capacitor line driving circuit 150, the gate electrode of the TFT 152 (the TFTs 152, 154 in the third embodiment) corresponding to the i-th capacitor line 132 is connected to the next (i+1)th row scanning line 112; however, it may be connected to the scanning line 112 located a certain number of scanning lines, that is, m scanning lines (m is an integer that is two or more), away therefrom like the scanning lines 112 below the (i+1)th row. Note that, when m increases, it is necessary for the gate electrode of the TFT 152 corresponding to the i-th capacitor line 132 to be connected to the (i+m)th row scanning line 112, thus making a wiring line be complex. In addition, m dummy scanning lines 112 are required in order to drive the TFT 152 (154) corresponding to the last 320th capacitor line 132. However, it is not necessary to particularly provide a dummy scanning line when the gate electrode of the TFT 152 (154) corresponding to the 320th capacitor line 132 is connected to the first scanning line 112 without a fly-back period when m is "1" as in the case of the above embodiments, or the gate electrode of the TFT 152 (154) corresponding to the 319th row, 320th capacitor lines 132 are respectively connected to the scanning lines 112 without a fly-back period when m is, for example, "2". Furthermore, it is also applicable that the voltage Vcom of the common electrode 108 is switched to attain a low level when the positive polarity writing is specified and to attain a high level when the negative polarity writing is specified.

In addition, in the above embodiments, the liquid crystal 105 is held between the pixel electrodes 118 and the common electrode 108 to form the pixel capacitors 120 and a direction in which an electric field is applied to the liquid crystal is set as a direction perpendicular to the surface of the substrate. However, it is applicable that a direction in which an electric field is applied to the liquid crystal may be set as a direction parallel to the surface of the substrate by laminating pixel electrodes, an insulation layer and a common electrode. On the other hand, in the above embodiments, since the vertical scanning direction is set in a direction that comes from the top toward the bottom in FIG. 1, the gate electrode of the TFT 152 corresponding to the i-th capacitor line 132 is connected to the (i+1)th row scanning line 112. However, if the vertical scanning direction is set in a direction that comes from the bottom toward the top, it is only necessary for the gate electrode of the TFT 152 corresponding to the i-th capacitor line 132 to be connected to the (i−1)th row scanning line 112. That is, the gate electrode of the TFT 152 corresponding to the i-th capacitor line 132 only needs to be connected to the scanning line 112, other than the i-th row scanning line, selected after the i-th row scanning line has been selected.

In addition, in the above described embodiments, in units of the pixel capacitor 120, the writing polarity is inverted every period of one frame. This is only to drive the pixel capacitors 120 using alternating current. Hence, the inversion period may be a period of two frames or more. Further, the pixel capacitor 120 is set as a normally white mode. However, a normally black mode in which a dark state is performed in a state where no voltage is applied may be used for the pixel capacitor 120. Moreover, it is applicable that a color display is performed by forming each dot with three pixels R (red), G (green), B (blue). It is also applicable that an additional color (for example, cyan (C)) is used and a color reproducibility is improved by forming each dot with these four color pixels.

In the above description, the reference voltage of the polarity writing is set to the voltage LCcom that is applied to the common electrode 108, but this is a case when the TFT 116 in each pixel 110 serves as an ideal switch. Actually, due to a parasitic capacitance between the gate and drain of the TFT 116, a phenomenon that the electric potential of the drain (pixel electrode 118) drops (which is called "push down", "punch through", "field through", or the like) occurs when the TFT 116 changes from an on state to an off state. In order to prevent degradation of liquid crystal, the pixel capacitors 120 should be driven by alternating current. However, when the alternating current driving is performed using the voltage LCcom applied to the common electrode 108 as a reference voltage of polarity writing, the voltage effective value of each pixel capacitor 120 by the negative polarity writing, because of push down, becomes slightly larger than the effective value of the positive polarity writing (when the TFT 116 is of a n-channel type). Therefore, in practice, the reference voltage of polarity writing is differentiated from the voltage LCcom of the common electrode 108. Specifically, the reference voltage of polarity writing may be set offset to the high level side from the voltage LCcom so as to cancel the influence of push down. Further, since the storage capacitors 130 are insulated in terms of direct current, it is only necessary to have the above relationship in a difference in electric potential applied between the first power feed line 165 and the second power feed line 167. For example, a difference in electric potential with the voltage LCcom may be any volt.

Electronic Apparatus

Figure 20:
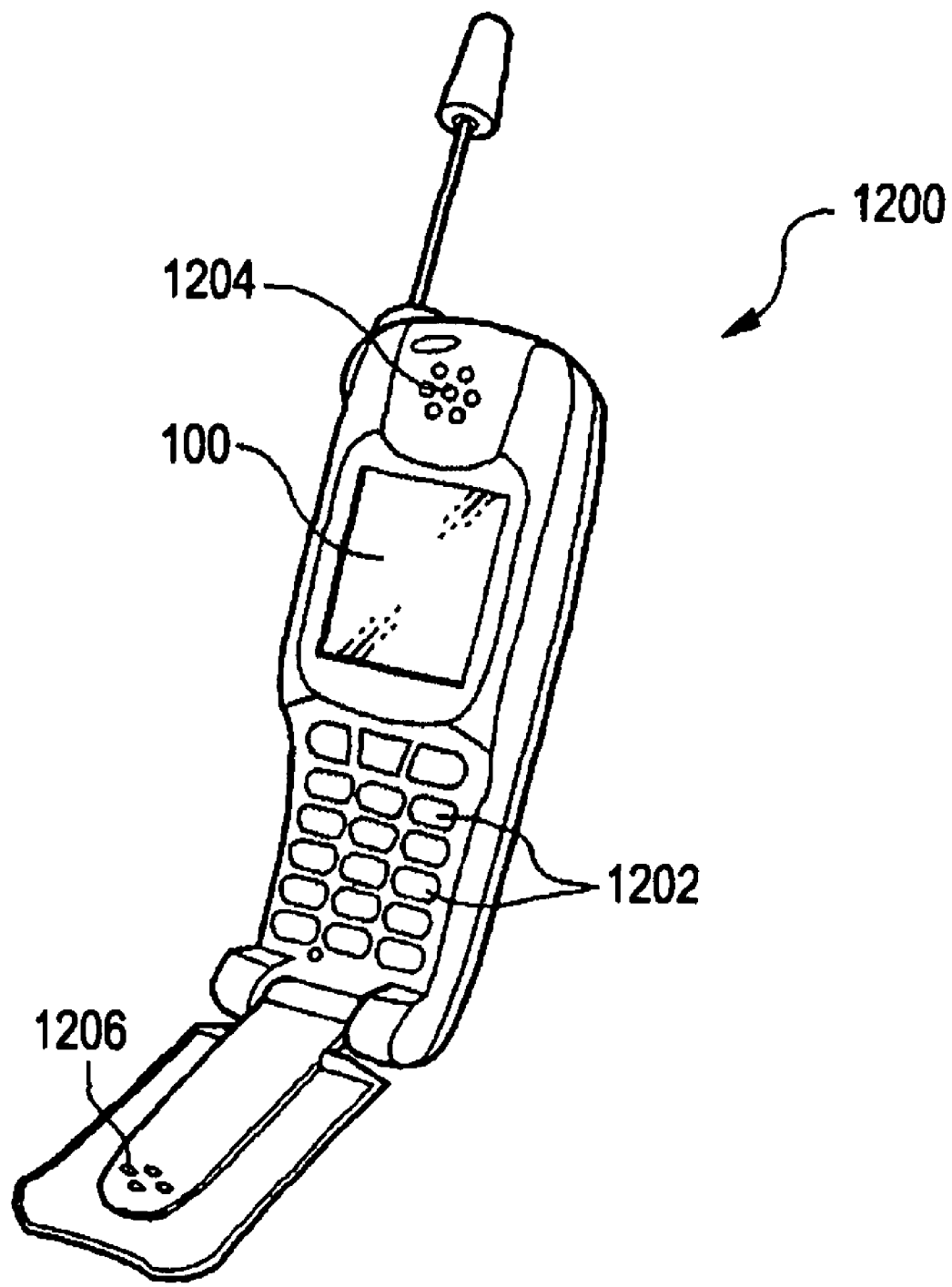
FIG. 20 is a view showing a mobile telephone that employs the electro-optical device according to the embodiments of the invention.

An electronic apparatus having the electro-optical device 10 according to the above described embodiments as a display device will now be described. FIG. 20 is a view showing a configuration of a mobile telephone 1200 that employs the electro-optical device 10 according to any one of the embodiments described above. As shown in the drawing, the mobile telephone 1200 includes a plurality of operation buttons 1202, an ear piece 1204, a mouth piece 1206, and the above described electro-optical device 10. Note that, of the electro-optical device 10, components corresponding to the display area 100 do not appear outside.

Note that electronic apparatuses to which the electro-optical device 10 is applied include, in addition to the mobile telephone shown in FIG. 20, a digital still camera, a laptop computer, a liquid crystal display television, a viewfinder (or a monitor direct view) video recorder, a car navigation system, a pager, an electronic organizer, an electronic calculator, a word processor, a workstation, a video telephone, a POS terminal, and a device provided with a touch panel. Needless to say, the above electro-optical device 10 is applicable to these various electronic apparatuses as a display device.

The entire disclosure of Japanese Patent Application No. 2006-217821, filed Aug. 10, 2006 is expressly incorporated by reference herein.

What is claimed is:

1. A driving circuit for an electro-optical device, comprising:
   a plurality of scanning lines arranged horizontally; a plurality of data lines arranged vertically;
   a plurality of capacitor lines provided in correspondence with the plurality of scanning lines;
   pixels arranged at positions corresponding to intersections of the plurality of scanning lines and the plurality of data lines, wherein each of the pixels includes a pixel switching element, a pixel capacitor and a storage capacitor, wherein one end of the pixel switching element is connected to a corresponding one of the data lines and is brought into an electrical conduction state when a corresponding one of the scanning lines is selected, wherein one end of the pixel capacitor is connected to the other end of the pixel switching element, and the other end of the pixel capacitor forms a common electrode, and wherein the storage capacitor is connected between the one end of the pixel capacitor and the capacitor line arranged in a position corresponding to that of the corresponding one of the scanning lines;
   a scanning line driving circuit that sequentially selects the scanning lines in a predetermined order;
   a capacitor line driving circuit that supplies a first capacitive signal to the capacitor line provided at a position corresponding to that of one scanning line when the one scanning line is selected, and changes a voltage applied to the one scanning line by a predetermined value when a scanning line, located a predetermined number of scanning lines away from the one scanning line, is selected;
   a first capacitive signal output circuit that outputs the first capacitive signal so that a first target voltage is applied to the capacitor line corresponding to the one scanning line when the one scanning line is selected; and a data line driving circuit that supplies the pixels corresponding to the selected scanning line with data signals of voltages corresponding to gray-scale levels of the pixels through the data lines, wherein the capacitor line driving circuit includes first and second transistors, both of which are provided in correspondence with the corresponding one of the capacitor lines, wherein a gate electrode of the first transistor corresponding to one capacitor line is connected to the scanning line corresponding to the one capacitor line and a source electrode of the first transistor is connected to a first power feed line that supplies the first capacitive signal, wherein a gate electrode of the second transistor is connected to the scanning line located a predetermined number of scanning lines away from the one scanning line and a source electrode of the second transistor is connected to a second power feed line that supplies a second capacitive signal, and wherein drain electrodes of the first transistor and the second transistor are commonly connected to the one capacitor line.

2. The driving circuit for the electro-optical device, according to claim 1, wherein the first capacitive signal output circuit buffers the first target voltage during a first period closer to the beginning of a period during which the one scanning line is selected, and executes a negative feedback control so that a voltage applied to the capacitor line becomes the first target voltage during a second period closer to the end of the period during which the one scanning line is selected.

3. The driving circuit for the electro-optical device, according to claim 1, wherein the capacitor line driving circuit connects one capacitor line to a first power feed line that supplies the first capacitive signal when the scanning line corresponding to the one capacitor line is selected, and connects the one capacitor line to a second power feed line that feeds a second capacitive signal when the scanning line, located a predetermined number of scanning lines away from the one scanning line, is selected.

4. The driving circuit for the electro-optical device, according to claim 3, further comprising:
a second capacitive signal output circuit that outputs the second capacitive signal to the second power feed line so that a voltage applied to the capacitor line becomes a second target voltage when the scanning line, located a predetermined number of scanning lines away from the one scanning line, is selected.

5. The driving circuit for the electro-optical device, according to claim 1, further comprising:
a detection line that is connected through a capacitor to the capacitor line provided in correspondence with the one scanning line, wherein the first capacitive signal output circuit outputs the first capacitive signal so as to cancel a noise component that appears in the detection line during a period when the one scanning line is selected.

6. An electro-optical device, comprising:
a plurality of scanning lines arranged horizontally;
a plurality of data lines arranged vertically;
a plurality of capacitor lines provided in correspondence with the plurality of scanning lines;
pixels arranged at positions corresponding to intersections of the plurality of scanning lines and the plurality of data lines, wherein each of the pixels includes a pixel switching element, a pixel capacitor and a storage capacitor, wherein one end of the pixel switching element is connected to a corresponding one of the data lines and is brought into an electrical conduction state when a corresponding one of the scanning lines is selected, wherein one end of the pixel capacitor is connected to the other end of the pixel switching element, and the other end of the pixel capacitor forms a common electrode, and wherein the storage capacitor is connected between the one end of the pixel capacitor and the capacitor line arranged at a position corresponding to that of the corresponding one of the scanning lines;
a scanning line driving circuit that sequentially selects the scanning lines in a predetermined order;
a capacitor line driving circuit that supplies a first capacitive signal to the capacitor line provided at a position corresponding to that of one scanning line when the one scanning line is selected, and changes a voltage applied to the one scanning line by a predetermined value when a scanning line, located a predetermined number of scanning lines away from the one scanning line, is selected;
a first capacitive signal output circuit that outputs the first capacitive signal so that a first target voltage is applied to the capacitor line corresponding to the one scanning line when the one scanning line is selected; and
a data line driving circuit that supplies the pixels corresponding to the selected scanning line with data signals of voltages corresponding to gray-scale levels of the pixels through the data lines, wherein the capacitor line driving circuit includes first and second transistors, both of which are provided in correspondence with the corresponding one of the capacitor lines, wherein a gate electrode of the first transistor corresponding to one capacitor line is connected to the scanning line corresponding to the one capacitor line and a source electrode of the first transistor is connected to a first power feed line that supplies the first capacitive signal, wherein a gate electrode of the second transistor is connected to the scanning line located a predetermined number of scanning lines away from the one scanning line and a source electrode of the second transistor is connected to a second power feed line that supplies a second capacitive signal, and wherein drain electrodes of the first transistor and the second transistor are commonly connected to the one capacitor line.

7. An electronic apparatus comprising the electro-optical device according to claim 6.

* * * * *